United States Patent
Qian et al.

(10) Patent No.: US 12,410,323 B2
(45) Date of Patent: Sep. 9, 2025

(54) POTENT ANTIFOULING AGENTS ALBOFUNGINS TARGET MULTIPLE FOULING ORGANISMS

(71) Applicants: The Hong Kong University of Science and Technology, Hong Kong (CN); Southern Marine Science and Engineering Guangdong Laboratory (Guangzhou), Guangzhou (CN)

(72) Inventors: Peiyuan Qian, Hong Kong (CN); Weiyi She, Hong Kong (CN); Aifang Cheng, Hong Kong (CN); Wenkang Ye, Hong Kong (CN); Ruojun Wang, Hong Kong (CN); Jinping Cheng, Hong Kong (CN); Chunfeng Ma, Hong Kong (CN)

(73) Assignees: The Hong Kong University of Science and Technology, Hong Kong (CN); Southern Marine Science and Engineering Guangdong Laboratory (Guangzhou), Guangzhou (CN)

( * ) Notice: Subject to any disclaimer, the term of this patent is extended or adjusted under 35 U.S.C. 154(b) by 584 days.

(21) Appl. No.: 17/813,988

(22) Filed: Jul. 21, 2022

(65) Prior Publication Data
US 2023/0086634 A1    Mar. 23, 2023

Related U.S. Application Data

(60) Provisional application No. 63/224,409, filed on Jul. 22, 2021.

(51) Int. Cl.
C09D 143/04  (2006.01)
C09D 5/14    (2006.01)
C09D 5/16    (2006.01)
C08K 5/3437  (2006.01)

(52) U.S. Cl.
CPC ............ *C09D 5/1625* (2013.01); *C09D 5/14* (2013.01); *C09D 143/04* (2013.01); *C08K 5/3437* (2013.01)

(58) Field of Classification Search
None
See application file for complete search history.

(56) References Cited

FOREIGN PATENT DOCUMENTS

WO    WO-0195909 A1 * 12/2001 ......... A61K 31/4741

OTHER PUBLICATIONS

Discovery, Bioactivity Evaluation, Biosynthetic Gene Cluster Identification, and Heterologous Expression of Novel Albofungin Derivatives, Frontiers in Microbiology, vol. 12, Feb. 1, 2021, She et al. (Year: 2021).*

(Continued)

*Primary Examiner* — Peter A Salamon
(74) *Attorney, Agent, or Firm* — Saliwanchik, Lloyd & Eisenschenk

(57) ABSTRACT

The present invention provides potent antibiofilm and antifouling compounds albofungin and derivatives thereof isolated from *Streptomyces chrestomyceticus* BCC 24770, the construction of high-yield strains for albofungin production, and application of albofungin-based copolymer coatings to object or surfaces, particularly to inhibit fouling by marine organisms using hydrolysable and degradable antifouling coatings incorporated with albofungins.

21 Claims, 15 Drawing Sheets
Specification includes a Sequence Listing.

(56) References Cited

OTHER PUBLICATIONS

Bixler, G.D., et al., "Biofouling: lessons from nature," Philosophical Transactions of the Royal Society A, 2012 370:2381-2417.
Bressy, C., et al., "Poly(trialkylsilyl methacrylate)s: A family hydrolysable polymers with tuneable erosion profiles," Polymer Degradation and Stability, 2010, 95:1260-1268.
Bunyapaiboonsri, T., et al., "Polycyclic tetrahydroxanthones from Streptomyces chrestomyceticus BCC 24770," Tetrahedron, 2016, 72:775-778.
Callow, M.E., et al., "Marine biofouling: a sticky problem," Biologist, 2002, 49(1):1-5.
Champ, M.A., "A review of organotin regulatory strategies, pending actions, related costs and benefits," The Science of the Total Environment, 2000, 258:21-71.
Chung, H.C., et al., "Bacterial community succession and chemical profiles of subtidal biofilms in relation to larval settlement of the polychaete Hydroides elegans," The ISME Journal, 2010, 4:817-828.
Heidarian, S., et al., "Anti-microfouling Activity of Glycomyces sediminimaris UTMC 2460 on Dominant Fouling Bacteria of Iran Marine Habitats," Frontiers in Microbiology, 2019, 9(3148): 1-14.
Hellio, C., et al., "Advances in marine antifouling coatings and technologies," 2009, p. 1-811.
Livak, K.J., et al., "Analysis of Relative Gene Expression Data Using Real-Time Quantitative PCR and the 2-ΔΔct Method," Methods, 2001, pp. 402-408.
Ma, C., et al., "Environmentally Friendly Antifouling Coatings Based on Biodegradable Polymer and Natural Antifoulant," ACS Sustainable Chem. Eng., 2017, 5:6304-6309.
Qian, P.-Y., et al., "Mini-review: Molecular mechanisms of antifouling compounds," Biofouling, 2013, 29(4):381-400.
Ralston, E., et al., "Bioinspiration—the solution for biofouling control?" Bioinspiration & Biomimetics, 2009, 4:1-9.
Satpathy, S., et al., "Review on bacterial biofilm: An universal cause of contamination," Biocatalysis and Agricultural Biotechnology, 2016, 7:56-66.
Schindelin, J., et al., "Fiji: an open-source platform for biological-image analysis," Nature Methods, 2012, 9(7):676-682.
Schloss, P.D., et al., "Introducing mothur: Open-Source, Platform-Independent, Community-Supported Software for Describing and Comparing Microbial Communities," Applied and Environmental Microbiology, 2009, 75(23):7537-7541.
She, W., et al., "Discovery, Bioactivity Evaluation, Biosynthetic Gene Cluster Identification, and Heterologous Expression of Novel Albofungin Derivatives," Frontiers in Microbiology, 2021, 12(635268):1-11.
She, W., et al., "A novel chresdihydrochalcone from Streptomyces chrestomyceticus exhibiting activity against Gram-positive bacteria," The Journal of Antibiotics, 2020, pp. 1-6.
Sisson, A.L., et al., "The contemporary role of ε-caprolactone chemistry to create advanced polymer architectures,".
Srinivasan, R., et al., "Bacterial Biofilm Inhibition: A Focused Review on Recent Therapeutic Strategies for Combating the Biofilm Mediated Infections," Frontiers in Microbiology, 2021, 12(676458):1-19.
Stewart, P.S., et al., "Antibiotic resistance of bacteria in biofilms," The Lancet, 2001, 358:135-138.
Wu, W.-S., et al., "Affinity-Based Screen for Inhibitors of Bacterial Transglycosylase," Journal of the American Chemical Society, 2018, 140:2752-2755.
Wang, K.-L., et al., "Mini-Review: Antifouling Natural Products from Marine Microorganisms and Their Synthetic Analogs," Marine Drugs, 2017, 15(266):1-21.
Wang, K.-L., et al., "Low-Toxicity Diindol-3-ylmethanes as Potent Antifouling Compounds," Mar Biotechnol, 2015, 17:624-632.
Wang, R., et al., "Exploring the Influence of Signal Molecules on Marine Biofilms Development," Frontiers in Microbiology, 2020, 11(571400):1-11.
Xie, Q., et al., "Dynamic surface antifouling: mechanism and systems," Soft Matter, 2019, 15:1087-1107.
Xu, Y., et al., "Potent antifouling compounds produced by marine Streptomyces," Biosource Technology, 2010, 101:1331-1336.
Yoon, S.-H., et al., "Introducing EzBioCloud: a taxonomically united database of 16S rRNA gene sequences and whole-genome assemblies," International Journal of Systematic and Evolutionary Microbiology, 2017, 67:1613-1617.
Zhou, X., "Inhibition, of Marine Biofouling by Use of Degradable and Hydrolyzable Silyl Acrylate Copolymer," Industrial & Engineering Chemistry Research, 2015, 54:9559-9565.

* cited by examiner

SEQUENCE LISTING

```
Sequence total quantity: 16
SEQ ID NO: 1              moltype = DNA   length = 25
FEATURE                   Location/Qualifiers
misc_feature              1..25
                          note = Primer pPWW50a-alb22-F
source                    1..25
                          mol_type = other DNA
                          organism = synthetic construct
SEQUENCE: 1
ggaattccat atggagcgcg acacc                                                 25

SEQ ID NO: 2              moltype = DNA   length = 27
FEATURE                   Location/Qualifiers
misc_feature              1..27
                          note = Primer pPWW50a -alb22-R
source                    1..27
                          mol_type = other DNA
                          organism = synthetic construct
SEQUENCE: 2
gactagttca gaacggccag gtctcct                                               27

SEQ ID NO: 3              moltype = DNA   length = 30
FEATURE                   Location/Qualifiers
misc_feature              1..30
                          note = Primer pPWW50a-alb45-F
source                    1..30
                          mol_type = other DNA
                          organism = synthetic construct
SEQUENCE: 3
ggaattccat atggacatca gcgtactggg                                            30

SEQ ID NO: 4              moltype = DNA   length = 25
FEATURE                   Location/Qualifiers
misc_feature              1..25
                          note = Primer pPWW50a -alb45-R
source                    1..25
                          mol_type = other DNA
                          organism = synthetic construct
SEQUENCE: 4
gactagttca gccggcccgg accag                                                 25

SEQ ID NO: 5              moltype = DNA   length = 20
FEATURE                   Location/Qualifiers
misc_feature              1..20
                          note = Primer qPCR-GAPDH-F
source                    1..20
                          mol_type = other DNA
                          organism = synthetic construct
SEQUENCE: 5
tcttcaccaa gaaggccgac                                                       20

SEQ ID NO: 6              moltype = DNA   length = 20
FEATURE                   Location/Qualifiers
misc_feature              1..20
                          note = Primer qPCR-GAPDH-R
source                    1..20
                          mol_type = other DNA
                          organism = synthetic construct
SEQUENCE: 6
tacttgtcct ggttgacgcc                                                       20

SEQ ID NO: 7              moltype = DNA   length = 20
FEATURE                   Location/Qualifiers
misc_feature              1..20
                          note = Primer qPCR-alb45-F
source                    1..20
                          mol_type = other DNA
                          organism = synthetic construct
SEQUENCE: 7
gtctcgacct cctcactggt                                                       20

SEQ ID NO: 8              moltype = DNA   length = 20
FEATURE                   Location/Qualifiers
misc_feature              1..20
                          note = Primer qPCR-alb45-R
source                    1..20
                          mol_type = other DNA
                          organism = synthetic construct
```

```
SEQUENCE: 8
gtgcgcagtt ggaggatgta                                                    20

SEQ ID NO: 9            moltype = DNA   length = 20
FEATURE                 Location/Qualifiers
misc_feature            1..20
                        note = Primer qPCR-alb22-F
source                  1..20
                        mol_type = other DNA
                        organism = synthetic construct
SEQUENCE: 9
gtcagcagtt cgtcggtgac                                                    20

SEQ ID NO: 10           moltype = DNA   length = 20
FEATURE                 Location/Qualifiers
misc_feature            1..20
                        note = Primer qPCR-alb22-R
source                  1..20
                        mol_type = other DNA
                        organism = synthetic construct
SEQUENCE: 10
cccaccacac tcggctacac                                                    20

SEQ ID NO: 11           moltype = DNA   length = 20
FEATURE                 Location/Qualifiers
misc_feature            1..20
                        note = Primer pPWW50a -check-F
source                  1..20
                        mol_type = other DNA
                        organism = synthetic construct
SEQUENCE: 11
aaccatgaga ggagagcggg                                                    20

SEQ ID NO: 12           moltype = DNA   length = 20
FEATURE                 Location/Qualifiers
misc_feature            1..20
                        note = Primer pPWW50a -check-R
source                  1..20
                        mol_type = other DNA
                        organism = synthetic construct
SEQUENCE: 12
tgagcgagga agcggaagag                                                    20

SEQ ID NO: 13           moltype = DNA   length = 20
FEATURE                 Location/Qualifiers
misc_feature            1..20
                        note = Primer 8F
source                  1..20
                        mol_type = other DNA
                        organism = synthetic construct
SEQUENCE: 13
agagtttgat cctggctcag                                                    20

SEQ ID NO: 14           moltype = DNA   length = 20
FEATURE                 Location/Qualifiers
misc_feature            1..20
                        note = Primer 1492R
source                  1..20
                        mol_type = other DNA
                        organism = synthetic construct
SEQUENCE: 14
cggttacctt gttacgactt                                                    20

SEQ ID NO: 15           moltype = DNA   length = 716
FEATURE                 Location/Qualifiers
source                  1..716
                        mol_type = genomic DNA
                        organism = Streptomyces chrestomyceticus
SEQUENCE: 15
ggaattccat atggagcgcg acaccgccgg ccggcacccg caggtacgga ccgaactcgc         60
ccggctcgta cgggacaccg cccggcgcct gaccgaccat cccttctacc ggggactggc        120
cgacggaacc ctgccggaag ccgccctggc gcacttcctc cagcaggacc actgcacgt         180
cctgcccgcc tacgccgccg cccacgcccg ctgtgccgcg gtagccgccg gccacccaca        240
cgccctgctg ttcagccgga tgggcaccgg caccgccgag gacgccgaac ggcgccagga        300
gcgggtacgg cggtgggcg aggacctcaa gctgccgctc gcggacgcg ccccgcgct           360
gctgcccacc acactcggct acaccgcctt cctgggcgcc gccccggccc gttccctgcc        420
cgcggggcc ggtgccgttt tacccgccgc ctggctgttc ctgctggtca ccgacgaact         480
gctgacccgg tgcgtaccgg gttccccgta cgcctcggtg atcgaggagt ggcacccggg        540
cgacacctat cgcgggctgg tggacgtgtt cctgggtgcc gtgaggaga tcgccgcgga        600
```

```
gtgctcaccg gccggccgcc gcaaactcgt cacctccgca cggcacgccg cctacttcga   660
gtgggcccac gtgaacgcgg cctggcggca ggagacctgg ccgttctgaa ctagtc       716

SEQ ID NO: 16          moltype = DNA  length = 842
FEATURE                Location/Qualifiers
source                 1..842
                       mol_type = genomic DNA
                       organism = Streptomyces chrestomyceticus
SEQUENCE: 16
ggaattccat atggacatca gcgtactggg gccgttcaga gcggttcagt cgggagtgtc    60
ggtgacaccc accgccgtca agccccgcaa ggtgctcgcc ctgctcgctc tgcaagccga   120
ccaactggtc tcgacctcct cactggtgga agaagtctgg ggtgagtcgc cgccgcgcag   180
cgtgcagacc accctgcaga cctacatcct ccaactgcgc accctcatct ccgccgccct   240
cggcgaggac ctcgcgggac tgccgaacgg cgcgaagagt gtcctggtga ccgaacccgg   300
cggttacctc ctcgacacca tgggcgggct ggtcgacgtc caggaatacg aagcgctggc   360
cacggccggc caccgggcgc tggagcaggg ggactgggc ggtgctgcga gctgcctggg    420
ccgggcgctg gcgctgtggc acggccgggc cctggtcgac gtgcagtgcg gtccactgct   480
ggaggtggag gtgacgcggc tggaggagtc acggatgagc gtccttcacg cgcggatcga   540
ggcggacctg aggctgggcc gccaccatga ggtcatcggt gaactgtccg gtctcgccgc   600
ccgccacccc ctgcacgagg gcgtccacgg acagctcatg gtggcgctgt accgggcggg   660
ccgccgcggg gacgccctca acacctaccg gcagttcgt gccgcgctgg gccagcacct    720
cggcctcgac ccgtcgccgg gcatcgagga cctccagcag gcggtgctcg actcctcacc   780
cctgctcggc ctggacggct ccctgccgct cgcacgcctg gtccgggccg gctgaactag   840
tc                                                                 842
```

POTENT ANTIFOULING AGENTS ALBOFUNGINS TARGET MULTIPLE FOULING ORGANISMS

CROSS-REFERENCE TO RELATED APPLICATION

This application claims the benefit of U.S. Provisional Application Ser. No. 63/224,409, filed Jul. 22, 2021, which is hereby incorporated by reference in its entirety including any tables, figures, or drawings.

SEQUENCE LISTING

The Sequence Listing for this application is labeled "HKUS.166X-SeqList-as filed.xml" which was created on Jul. 21, 2022 and is 21,970 bytes. The entire contents of the sequence listing is incorporated herein by reference in its entirety.

BACKGROUND OF THE INVENTION

Marine biofouling is the natural colonization of undesirable micro and macro-organisms on submerged artificial surfaces. These organisms are roughly bifurcated into microfoulers, such as bacteria and diatoms, and macrofoulers, such as barnacles, mussels, tubeworms, and bryozoans (Callow and Callow, 2002). The bacterial biofilm is composed of diverse bacterial colonies of cells that form a community. A biofilm is a multidimensional (3-D) aggregation of bacteria attached to a surface and enclosed in an extracellular polymeric matrix (EPS), which is composed of polysaccharides, proteins, e-DNA, and phospholipids (Srinivasan et al., 2021). Compared to microorganisms, the matrix makes up over 90% of the dry mass, and various mechanisms enable different organisms to adhere firmly to surfaces, interact with cells, and build complex structures (Satpathy et al., 2016). The colonization through biofilm formation by microfoulers attracts macrofoulers to attach, such as the tubeworm *Hydroides elegans*, which prefer to settle on biofilm surfaces (Ralston and Swain, 2009). Compared to planktonic bacteria, biofilm bacteria are 10- to 1,000-times more resistant to antibiotics (Stewart and Costerton, 2001). Nearly all marine structures in seawater are colonized with biofilm-forming bacteria. Biofilms colonize ship hulls, underwater pipelines, and marinas, causing a substantial economic loss in marine operations and environmental problems, including the introduction of invasive species (Hellio and Yebra, 2009). For example, ships need additional power due to the extra burden from biofouler attachment, leading to high fuel consumption and heavy engine stress (Bixler and Bhushan, 2012).

Various antifouling technologies have been developed to prevent biofouling, including the addition of antifouling agents such as copper pyrithione, chlorothalonil, zinc pyrithione, and SeaNine 211 to marine paints (Qian et al., 2013). Besides these, antifouling paint containing biocide tributyltin (TBT) is highly efficient in preventing the settlement and growth of biofoulers, but it is toxic towards non-target organisms and persistent in marine environments; hence, its application on ships has been banned by the International Maritime Organization (IMO) (Champ, 2000).

In recent years, antifouling compounds derived from various natural sources have been discovered. Especially, bacterial sources of bioactive compounds are preferable as they can be reproduced and scaled up for ensuring product supply for commercialization (Heidarian et al., 2019). It is undeniable that natural products isolated from bacterial fermentation are vast resources for the exploitation of antifouling compounds. For example, butenolide isolated from the marine bacterium *Streptomyces albidoflavus* prevents the settlement of dominant fouling organisms (barnacles, tubeworms, and bryozoans) with a low toxic effect (Xu et al., 2010); 3,3-Diindolylmethane isolated from *Pseudovibrio denitrificans* exhibits antifouling activities against barnacles and bryozoans with equivalent field performance to that of the commercial antifouling agent SeaNine 211 (Wang et al., 2015). Previously reported natural products with antifouling activity also include fatty acids, lactones, terpenes, steroids, benzenoids, phenyl ethers, polyketides, alkaloids, nucleosides, and peptides (Wang et al., 2017). However, it is difficult to develop marine natural product-based antifouling coatings because of the quick release of antifouling compounds, the complicated procedure for chemical synthesis, and the low yields of the antifoulants (Sisson et al., 2013). To solve problems related to compound release control, the self-polishing copolymer, which uses silyl acrylate as a carrier of antifoulants, generates a self-renewing surface through hydrolysis and degradation and thus, controls antifouling compound release (Bressy et al., 2010; Xie et al., 2019).

Thus, there is an urgent need to develop non-toxic, cost-effective, and environmentally friendly antifouling compositions and methods of using said compositions.

BRIEF SUMMARY OF THE INVENTION

This subject invention provides antifouling compositions and methods for inhibiting fouling, including, for example, the settlement of marine invertebrate larvae and the formation of bacterial biofilms. Specifically, this invention pertains to antifouling compositions comprising albofungin, a derivative of albofungin, or a combination thereof, which can show potent antibiofilm activities against biofilm-forming marine bacterial strains and ESKAPE (*Enterococcus faecium, Staphylococcus aureus, Klebsiella pneumoniae, Acinetobacter baumannii, Pseudomonas aeruginosa*, and *Enterobacter* spp.) pathogens at a low micromolar range and anti-macrofouling activities against larval settlement of the macroorganisms, such as, for example, the barnacle *Amphibalanus amphitrite* and the bryozoan *Bugula neritina*, with low cytotoxicity.

In certain embodiments, an antifouling coating comprising albofungin and/or a derivative thereof can be incorporated into a hydrolysable and degradable copolymer that can efficiently inhibit the settlement of macrofouling organisms and alter biofilm structures, particularly in marine environments.

In certain embodiments, the production of albofungin or a derivative thereof using bacterial fermentation can be increased using transcriptional regulators alb22 from the transcriptional enhancer A family and alb45 from the *Streptomyces* antibiotic regulatory protein family overexpressed in *Streptomyces chrestomyceticus*, which can significantly increase albofungin production.

BRIEF DESCRIPTION OF THE DRAWINGS

(FIG. 2B), *Staphylococcus* sp. (FIG. 2C), *Sulfitobacter pontiacus* (FIG. 2D), and *Pseudomonas pachastrellae* (FIG. 2E) by albofungins (1-4). Error bars represent SD (n=9 wells from 3 batches of microbial cultures). Significant differences were analyzed by one-way ANOVA compared with the control biofilm, *p<0.05, p<0.01, and *p<0.001.

(FIG. 3C) Stimulation rate curve of albofungin (1) treatment on *A. amphitrite* larvae. Error bars represent SD (n=9 wells from 3 batches of larval cultures). (FIG. 3D) Different conditions of *A. amphitrite* and *B. neritina* larvae during the bioassay. Scale bars=100 μm. Larval settlement rate (FIG. 3E) and larval mortality rate (FIG. 3F) of *B. neritina* under the treatment of albofungin (1) with concentrations of 0.625 μg mL$^{-1}$ to 20 μg mL$^{-1}$ for 3 hours. Error bars represent SD (n=9 wells from 3 batches of larval cultures). Significant differences were analyzed by one-way ANOVA, *p<0.05, p<0.01, and *p<0.001. (FIG. 3G) Stimulation rate curve of albofungin (1) treatment on *B. neritina* larvae. Error bars represent SD (n=9 wells from 3 batches of larval cultures).

(FIG. 4B) PCR verification for the positive conjugants. M: D2000 marker; 1-2: conjugants from 24770/pPWW-alb22; 3~4: conjugants from 24770/pPWW-alb45. (FIG. 4C) Crude extracts of 24770/pPWW-alb22, 24770/pPWW and 24770/pPWW-alb45 at 7 days (dissolved in methanol). (FIG. 4D) Standard curve for albofungin production calculation.

(FIG. 5A) Albofungin production (mg L$^{-1}$) by 24770/pPWW (parental strain), 24770/pPWW-alb22 and 24770/pPWW-alb45 overexpression strains. Error bars represent SD (n=3 independent cultures). Significant differences were analyzed by one-way ANOVA, *p<0.05, p<0.01, and *p<0.001. (FIG. 5B) HPLC analysis (300 nm) of the crude extracts of 24770/pPWW, 24770/pPWW-alb45 and 24770/pPWW-alb22 at 7 days. (FIGS. 5C-5D) Relative expression level of alb45 and alb22 in 24770/pPWW, 24770/pPWW-alb45 and 24770/pPWW-alb22 strains. GAPDH was used as a reference gene, and 24770/pPWW served as a control. Error bars represent SD (n=3 independent cultures). Significant differences were analyzed by Student's t-test, *p<0.05, p<0.01, and *p<0.001.

(FIG. 6A) The copolymer was coated with 5, 10, and 15 wt % albofungin on PVC panels. Control was coated with copolymer only. (FIG. 6B-6C) Percentage of coverage of biofoulers after 1 month (FIG. 6B) and 2 months (FIG. 6C). Error bars represent SD (n=3). Significant differences were analyzed by one-way ANOVA, *p<0.05, p<0.01, and *p<0.001. (FIG. 6D) Time-dependent release rate of albofungin into artificial seawater. Error bars represent SD (n=3).

(FIG. 7A) Relative abundance of the major bacterial phylum of biofilms developed in 5 wt % albofungin-based copolymer coatings and control with only copolymer coatings (Proteobacteria are further classified into the classes). (FIG. 7B) Observed OTUs of albofungin-based copolymer coatings and control with only copolymer coatings. Error bars represent SD. Significant differences were analyzed by Student's t-test, *p<0.05, p<0.01, and *p<0.001. (FIG. 7C) Shannon-Weiner diversity index of albofungin-based copolymer coatings and control with only copolymer coatings (al-1, al-2, al-3, al-4 and control-1, control-2). Error bars represent SD. Significant differences were analyzed by Student's t-test, *p<0.05, p<0.01, and *p<0.001.

BRIEF DESCRIPTION OF THE SEQUENCES

Figure 1:
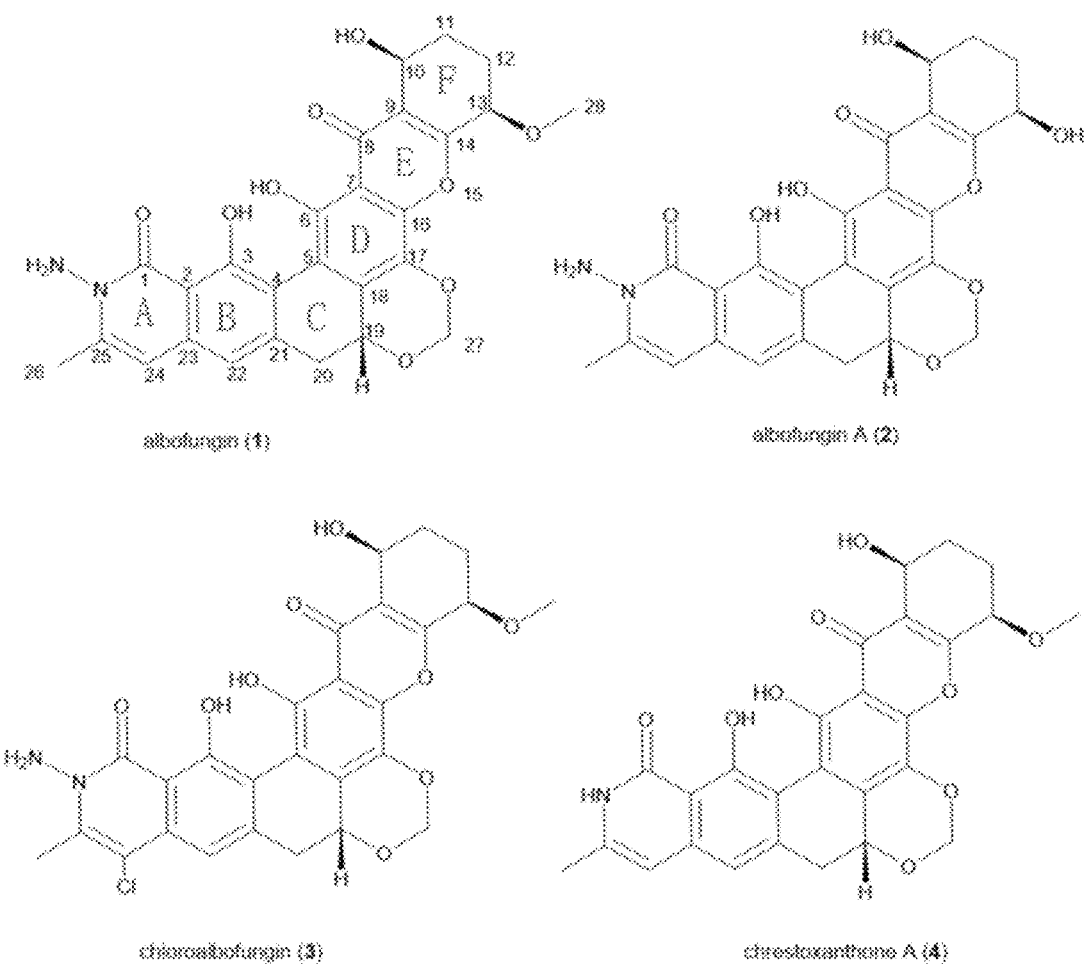
FIG. 1 shows chemical structures of albofungins (1-4) isolated from *Streptomyces chrestomyceticus* BCC 24770.
Figure 2A:
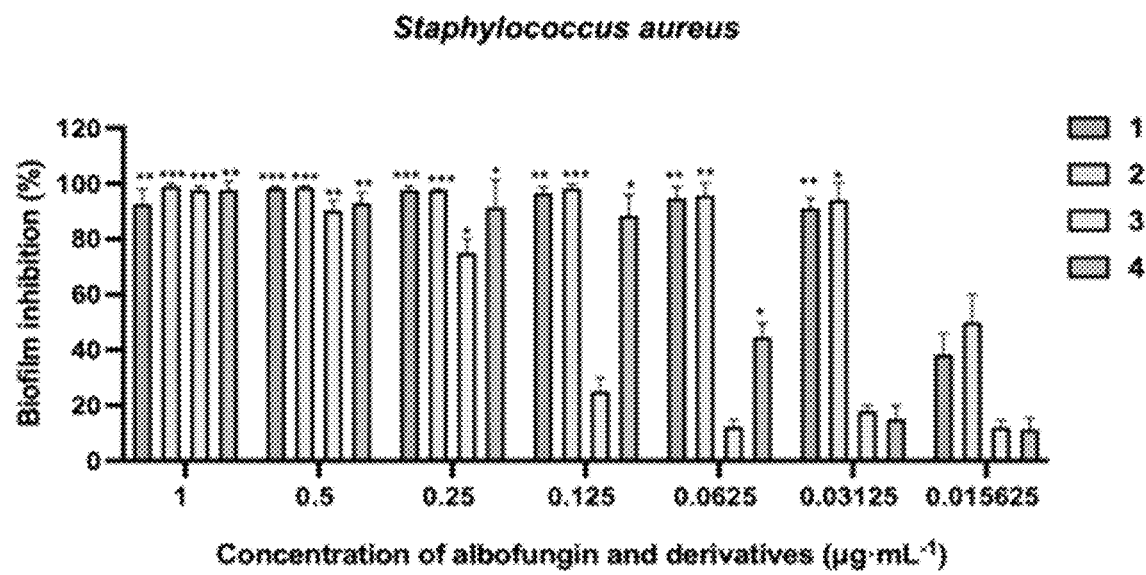
FIGS. 2A-2E shows inhibition of biofilm formation of *Staphylococcus aureus* (FIG. 2A), *Micrococcus* sp.
Figure 2B:
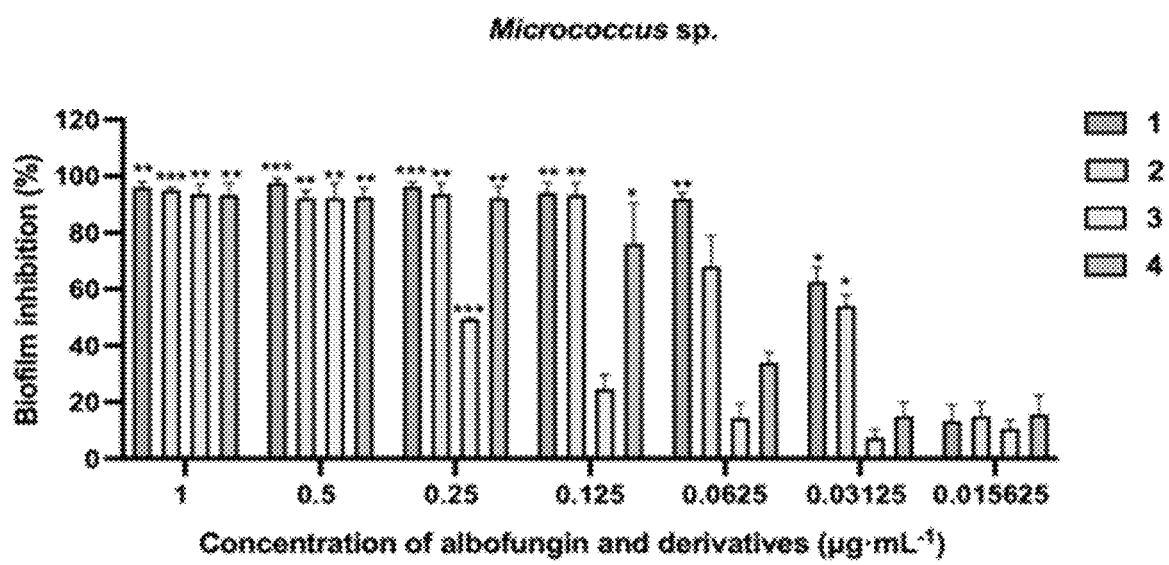
Figure 2C:
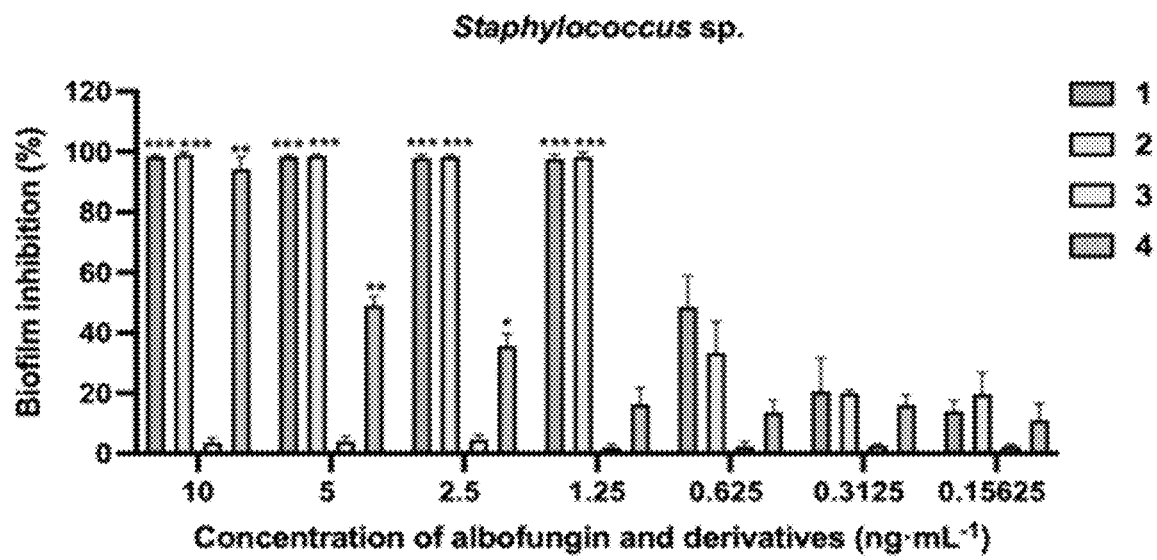
Figure 2D:
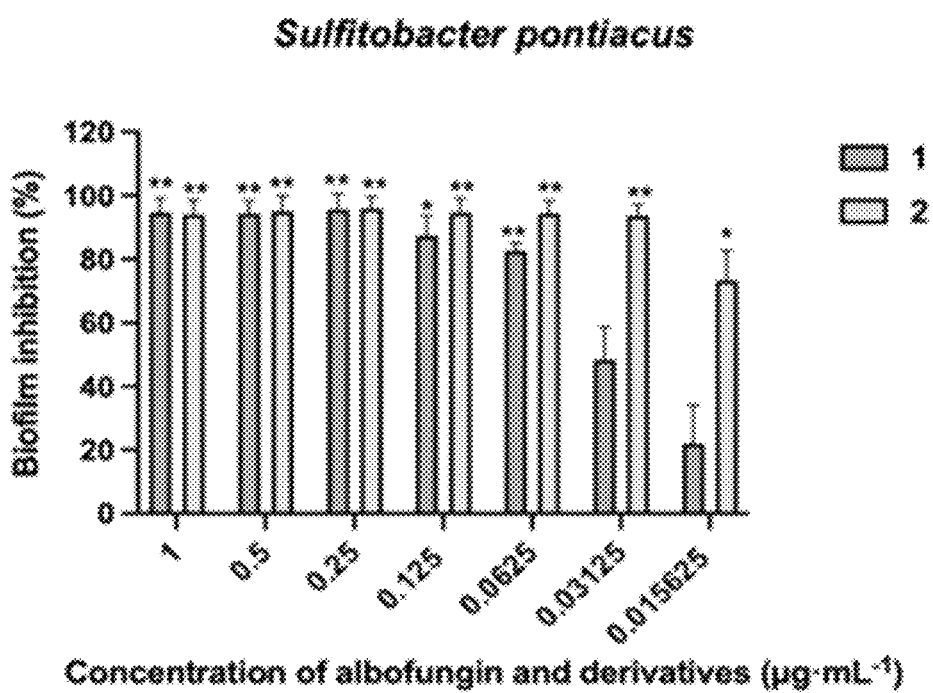
Figure 2E:
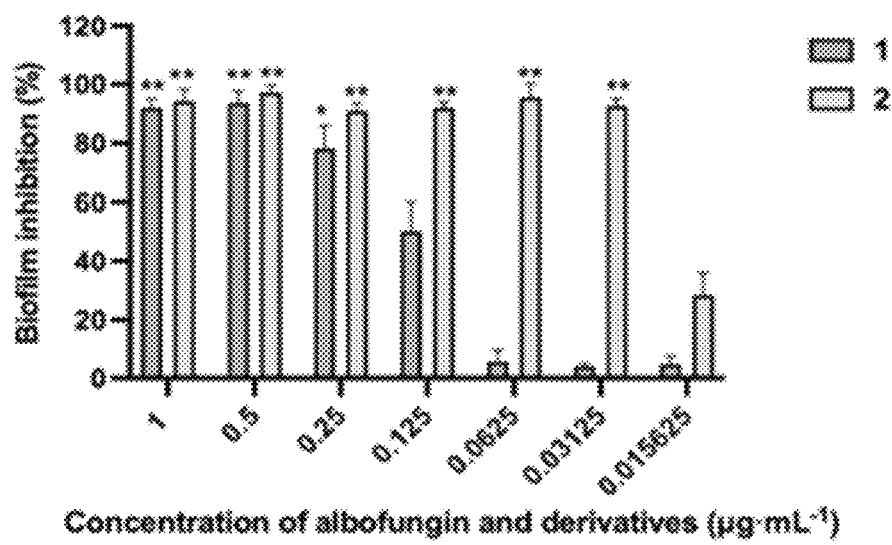

SEQ ID NO: 1: primer PPWW50A-ALB22-F
SEQ ID NO: 2:primer PPWW50A-ALB22-R
SEQ ID NO: 3: primer PPWW50A-ALB45-F
SEQ ID NO: 4: primer PPWW50A-ALB45-R
SEQ ID NO: 5: primer QPCR-GAPDH-F
SEQ ID NO: 6: primer QPCR-GAPDH-R
SEQ ID NO: 7: primer QPCR-ALB45-F
SEQ ID NO: 8: primer QPCR-ALB45-R
SEQ ID NO: 9: primer QPCR-ALB22-F
SEQ ID NO: 10: primer QPCR-ALB22-R
SEQ ID NO: 11: primer PPWW50A-CHECK-F
SEQ ID NO: 12: primer PPWW50A-CHECK-R
SEQ ID NO: 13: primer 8F
SEQ ID NO: 14: primer 1492R
SEQ ID NO: 15: alb22 sequence
SEQ ID NO: 16: alb45 sequence

DETAILED DISCLOSURE OF THE INVENTION

Selected Definitions

As used herein, the singular forms "a," "an," and "the" are intended to include the plural forms as well, unless the context clearly indicates otherwise. Further, to the extent that the terms "including," "includes," "having," "has," "with," or variants thereof are used in either the detailed description and/or the claims, such terms are intended to be inclusive in a manner similar to the term "comprising." The transitional terms/phrases (and any grammatical variations thereof) "comprising," "comprises," "comprise," include the phrases "consisting essentially of," "consists essentially of," "consisting," and "consists."

The phrases "consisting essentially of" or "consists essentially of" indicate that the claim encompasses embodiments containing the specified materials or steps and those that do not materially affect the basic and novel characteristic(s) of the claim.

The term "about" means within an acceptable error range for the particular value as determined by one of ordinary skill in the art, which will depend in part on how the value is measured or determined, i.e., the limitations of the measurement system. Where particular values are described in the application and claims, unless otherwise stated the term "about" meaning within an acceptable error range for the particular value should be assumed.

In the present disclosure, ranges are stated in shorthand, to avoid having to set out at length and describe each and every value within the range. Any appropriate value within the range can be selected, where appropriate, as the upper value, lower value, or the terminus of the range. For example, a range of 1-10 represents the terminal values of 1 and 10, as well as the intermediate values of 2, 3, 4, 5, 6, 7, 8, 9, and all intermediate ranges encompassed within 1-10, such as 2-5, 2-8, and 7-10. Also, when ranges are used herein, combinations and sub-combinations of ranges (e.g., subranges within the disclosed range) and specific embodiments therein are intended to be explicitly included.

As used herein, reference to a "microbe-based composition" means a composition that comprises components that were produced as the result of the growth of microorganisms or other cell cultures. Thus, the microbe-based composition may comprise the microbes themselves and/or by-products of microbial growth. The by-products of growth may be, for example, metabolites, cell membrane components, expressed proteins, and/or other cellular components. The microbes may be intact or lysed. The microbes may be present in or removed from the composition. The microbes can be present, with broth in which they were grown, in the microbe-based composition. The cells may be present at, for example, a concentration of at least $1\times10^4$, $1\times10^5$, $1\times10^6$, $1\times10^7$, $1\times10^8$, $1\times10^9$, $1\times10^{10}$, $1\times10^{11}$, $1\times10^{12}$, or more CFU per milliliter of the composition.

The subject invention further provides "microbe-based products," which are products that are to be applied in practice to achieve a desired result. The microbe-based product can be simply the microbe-based composition harvested from the microbe cultivation process. Alternatively, the microbe-based product may comprise further ingredients that have been added. These additional ingredients can include, for example, stabilizers, buffers, appropriate carriers, such as water, salt solutions, or any other appropriate carrier, added nutrients to support further microbial growth, non-nutrient growth enhancers, such as plant hormones, and/or agents that facilitate tracking of the microbes and/or the composition in the environment to which it is applied. The microbe-based product may also comprise mixtures of microbe-based compositions. The microbe-based product may also comprise one or more components of a microbe-based composition that have been processed in some way such as, but not limited to, filtering, centrifugation, lysing, drying, purification and the like.

As used herein, "harvested" refers to removing some or all of a microbe-based composition from a growth vessel.

As used herein, an "isolated" or "purified" nucleic acid molecule, polynucleotide, polypeptide, protein or organic compound such as a small molecule (e.g., those described below), is substantially free of other compounds, such as cellular material, with which it is associated in nature. A purified or isolated polynucleotide (ribonucleic acid (RNA) or deoxyribonucleic acid (DNA)) is free of the genes or sequences that flank it in its naturally-occurring state. A purified or isolated polypeptide is free of the amino acids or sequences that flank it in its naturally-occurring state. An isolated microbial strain means that the strain is removed from the environment in which it exists in nature. Thus, the isolated strain may exist as, for example, a biologically pure culture, or as spores (or other forms of the strain) in association with a carrier.

As used herein, "vector" refers to a DNA molecule such as a plasmid for introducing a nucleotide construct, for example, a DNA construct, into a host cell. Cloning vectors typically contain one or a small number of restriction endonuclease recognition sites at which foreign DNA sequences can be inserted in a determinable fashion without loss of essential biological function of the vector, as well as a marker gene that is suitable for use in the identification and selection of cells transformed with the cloning vector. Marker genes typically include genes that provide a selectable characteristic, such as tetracycline resistance, hygromycin resistance or ampicillin resistance.

As used in herein, the terms "identical" or "percent identity", in the context of describing two or more polynucleotide sequences, refer to two or more sequences or subsequences that are the same or have a specified percentage of nucleotides that are the same over the compared region. For example, a homologous nucleotide sequence used in the method of this invention has at least 80% sequence identity, preferably 85%, 90%, 91%, 92%, 93, 94%, 95%, 96%, 97%, 98%, 99%, or 100% identity, to a reference sequence, when compared and aligned for maximum correspondence over a comparison window, or over a designated region as measured using a comparison algorithms or by manual alignment and visual inspection. With regard to polynucleotide sequences, this definition also refers to the complement of a test sequence.

The phrase "a transformed bacterial cell" as used herein refers to a bacterial cell in which the cells are transformed with a DNA vector disclosed herein.

In certain embodiments, purified compounds are at least 60% by weight the compound of interest. Preferably, the preparation is at least 75%, more preferably at least 90%, and most preferably at least 98%, by weight the compound of interest. For example, a purified compound is one that is at least 80%, 85%, 90%, 91%, 92%, 93%, 94%, 95%, 98%, 99%, or 100% (w/w) of the desired compound by weight. Purity is measured by any appropriate standard method, for example, by column chromatography, thin layer chromatography, or high-performance liquid chromatography (HPLC) analysis.

A "metabolite" refers to any substance produced by metabolism or a substance necessary for taking part in a particular metabolic process. A metabolite can be an organic compound that is a starting material, an intermediate in, or an end product of metabolism. Examples of metabolites include, but are not limited to organic compounds, enzymes, acids, solvents, alcohols, proteins, vitamins, minerals, microelements, amino acids, biopolymers and biosurfactants.

As used herein a "reduction" means a negative alteration, and an "increase" means a positive alteration, wherein the negative or positive alteration is at least 0.001%, 0.01%, 0.1%, 0.5%, 1%, 5%, 10%, 15%, 20%, 25%, 30%, 35%, 40%, 45%, 50%, 55%, 60%, 65%, 70%, 75%, 80%, 85%, 90%, 95% or 100%.

According to the subject invention, a harmful accumulation of material, including living organisms or non-living substances results in the process of "fouling." "Fouling" can result in clogging, scaling, or other undesired buildup. "Fouling" can affect the efficiency, reliability, or functionality of the object.

As used herein, "contaminant" refers to any substance that causes another substance or object to become fouled or impure. Contaminants can be living or non-living and can be inorganic or organic substances or deposits. Living organisms can include bacteria, such as, *Sulfitobacter* spp., *Psychrobacter* spp., cyanobacteria, *Pseudomonas* spp., *Bacillus* spp., *Enterococcus* spp., *Staphylococcus* spp. *Klebsiella* spp., *Micrococcus* spp., *Enterobacter* spp., and *Acinetobacter* spp.; and eukaryotic organisms, such as algae, yeast, fungi, barnacles (e.g., *Amphibalanus amphitrite*), tubeworms, Bryozoa (e.g., *Bugula neritina*), and mussels. Furthermore, contaminants can include, but are not limited to, scales, hydrocarbons, and dissolved organic matters, such as, for example, amino acids and proteins derived from biomass. Reference to "scale" means any type of scale that results from the precipitation of, for example, barium sulfate, calcium carbonate, calcium sulfate, calcium oxalate, magnesium hydroxide, magnesium oxide, silicates, strontium sulfate, aluminum oxide hydroxides, aluminosilicates, magnetite or nickel ferrite, sodium chloride, silicon dioxide, iron sulfide, iron oxides, iron carbonate, copper, phosphates, oxides, and any other mineral compound that can precipitate and form deposits.

As used herein, a "biofilm" is a complex aggregate of microorganisms, such as bacteria, wherein the cells adhere to each other and/or to a surface using an extracellular polysaccharide matrix. The cells in biofilms are physiologically distinct from planktonic cells of the same organism, which are single cells that can float or swim in liquid medium.

As used herein, the term "effective amount" is used to refer to an amount of a compound or composition that, when applied or contacted to a surface or organism, is capable of inhibiting, preventing, or improving fouling. In other words, when applied or contacted to a surface or organism, the amount is "effective." The actual amount will vary depending on a number of factors including, but not limited to, the one or more substances that are causing the fouling being inhibited, prevented, or improved; the severity of the fouling; and the route of application.

The recitation of a listing of chemical groups in any definition of a variable herein includes definitions of that variable as any single group or combination of listed groups. The recitation of an embodiment for a variable or aspect herein includes that embodiment as any single embodiment or in combination with any other embodiments or portions thereof.

All references cited herein are hereby incorporated by reference in their entirety.

Compounds

In preferred embodiments, the compositions and methods according to the subject invention utilize isolated albofungin and/or derivatives thereof, including, for example, albofungin A, chloroalbofungin, chrestoxanthone A, and/or bacterial culture extracts containing albofungin and/or derivatives thereof. Albofungin and derivatives thereof, including, for example albofungin A, chloroalbofungin, and chrestoxanthone A, may be in a purified form or in a mixture of bacterial growth products, including crude extracts. Albofungin and derivatives thereof may be added to compositions at concentrations of about 0.1 to about 50% by weight (wt %), preferably about 1 to about 15 wt %, and more preferably about 5 to about 10 wt %. In another embodiment, purified albofungin and derivatives thereof may be in combination with an acceptable carrier, in that albofungin and derivatives thereof may be presented at concentrations of about 0.1 to about 50% (v/v), preferably, about 1 to about 15% (v/v), more preferably, about 10 to about 15% (v/v).

The following are chemical formulas of albofungin (compound 1; Formula (I)) and derivatives thereof, including albofungin A (compound 2: Formula (II)), chloroalbofungin (compound 3; Formula (III)), and chrestoxanthone A (compound 4: Formula (IV)):

Formula (I)

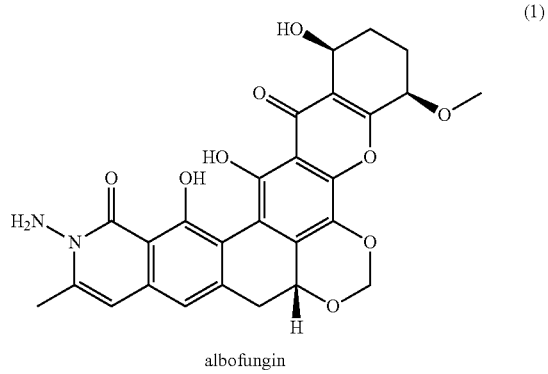

albofungin

Formula (II)

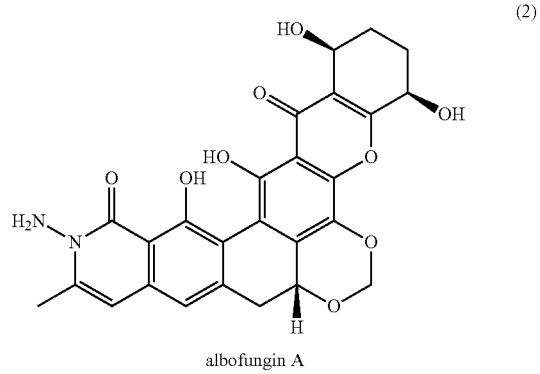

albofungin A

Formula (III)

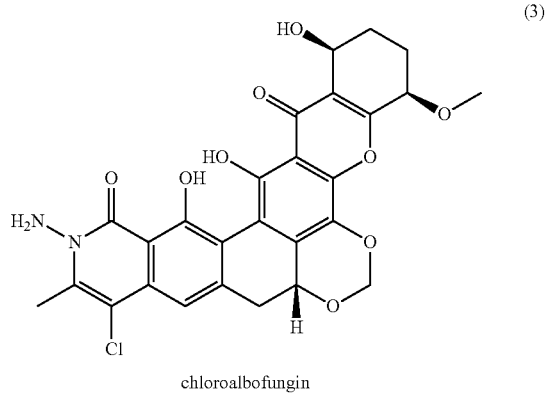

chloroalbofungin

Formula (IV)

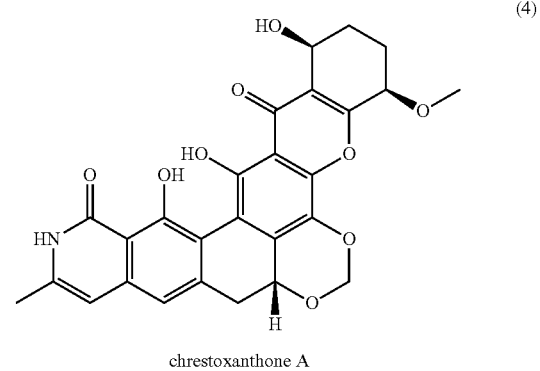

chrestoxanthone A

The microorganisms utilized according to the subject invention may be natural, or genetically modified microorganisms, specifically microorganisms that can synthesize the compounds of the subject invention. For example, the microorganisms may be transformed with specific genes to exhibit specific characteristics. The microorganisms may also be mutants of a desired strain. As used herein, "mutant" means a strain, genetic variant or subtype of a reference microorganism, wherein the mutant has one or more genetic variations (e.g., a point mutation, missense mutation, nonsense mutation, deletion, duplication, frameshift mutation or repeat expansion) as compared to the reference microorganism. Procedures for making mutants are well known in the microbiological art. For example, plasmid conjugation are used extensively toward this end. In certain embodiments, a *Streptomyces* sp. can be conjugated with a plasmid encoding transcriptional regulators, such as, for example, alb22, alb45, or a combination thereof. In certain embodiments, alb22 is according to SEQ ID NO: 15 (SEQ ID NO: 15: ggaattccatatg-
gagcgcgacaccgccggccggcacccgcaggtacggaccgaactcgcccgg ctcgtacgggacaccgcccggcg cctgaccgaccatcccttc-taccggggactggccgacggaaccctgccg-
gaagccgccctggcgcacttcctccagcaggaccactggc acgtcctgcccgcctacgccgccgcc-
cacgcccgctgtgccgcggtagccgccggccacc-
cacacgccctgctgttcagccggatggg
caccggcaccgccgaggacgccgaacggcgccag-
gagcgggtacggcggtggggcgaggacctcaagctgccgctcgcggacggc gcccccgcgctgctgcccaccacactcggcta-
caccgccttcctgggcgccgccccggcccgttccctgcccgcggggccggt gccg ttttacccgccgcctggctgttcctgctggt-caccgacgaactgctgacccggtgcgtaccgggttcccggtacgcctcggt-gatcgaggag tggcaccccggcgacacc-
tatcgcgggctggtggacgtgttcctgggtgccgtggaggagatcgccgcgga gtgctcaccggccggcc gccgcaaactcgtcacctccgcacggcacgccgcc-tacttcgagtgggcccacgtgaacgcggcctggcggcaggagacctggccgtt ctgaactagtc) or a sequence with at least 90% sequence identity to SEQ ID NO: 15. In certain embodiments, alb45 is according to SEQ ID NO: 16 (SEQ ID NO: 16: ggaattc-catatggacatcagcgtactggggccgttcagagcggttcagtcgg-
gagtgtcggtgacaccaccgccgtcaagccccgcaa
ggtgctcgccctgctcgctctgcaagccgaccaactggtctcgacctcct-cactggtggaagaagtctggggtgagtcgccgccgcgcag cgtgcagac-caccctgcagacctacatcctccaactgcgcaccct-
catctccgccgccctcggcgaggacctcgcgggactgccgaacg gcgcgaagagtgtcctggtgaccgaacccgccggttacctcctcgacac-catgggcgggctggtcgacgtccaggaatacgaagcgctg gccacggccggc-caccgggcgctg-
gagcaggggggactggggcggtgctgcgagctgcctgggccgggcgctggcg ctgtggcacg gccgggcctggtcgacgtgcagtgcggtccactgctg-gaggtggaggtgacgcggctggaggagtcacggatgagcgtccttcacgc gcggatcgaggcggacctgaggctgggccgccaccatgaggtcatcggt-gaactgtccggtctcgccgccgccaccccctgcacgag ggcgtc-cacggacagct-
catggtggcgctgtaccgggcgggccgccgcggggacgccctcaacaccta ccggcagttgcgtgccgcg
ctgggccagcacctcggcctcgacccgtcgccggg-
catcgaggacctccagcaggcggtgctcgactcctcaccctgctcggcctgga cggctccctgccgctcgcacgcctggtccgggccggctgaactagtc) or a sequence with at least 90% sequence identity to SEQ ID NO: 16.

In certain embodiments, the microorganisms are any bacteria that produce compounds albofungin and derivatives thereof, including, for example, chloroalbofungin, albofungin A, chloroalbofungin, and chrestoxanthone A. Albofungin and derivatives thereof, including, for example, albofungin A, chloroalbofungin, and chrestoxanthone A, and/or associated bacterial culture extracts can be produced by bacteria, including *Streptomyces* spp. In preferred embodiments, albofungin and derivatives thereof, including, for example, albofungin A, chloroalbofungin, and chrestoxanthone A are produced by *Streptomyces chrestomyceticus* BCC 24770.

In one embodiment, the method for cultivation of microorganisms is carried out at about 5° C. to about 100° C., about 15° C. to about 60° C., about 20° C. to about 37° C., preferably, about 20° C. to about 30° C., or, more preferably, about 23° C. to about 30° C. In a further embodiment, the cultivation may be carried out continuously at a constant temperature. In another embodiment, the cultivation may be subject to changing temperatures.

In one embodiment, the equipment used in the method and cultivation process is sterile. The cultivation equipment such as the reactor/vessel may be separated from, but connected to, a sterilizing unit, e.g., an autoclave. In certain embodiments, the bacteria can undergo fermentation, said fermentation comprising contacting bacterial cells to a seed medium (4 g of yeast extract, 10 g of malt extract, and 4 g of D-glucose per liter of distilled water) at about 20° C. to 37° C., preferably about 23° C. to about 30° C., for 1 hour to about 14 days, preferably about 12 hours to about 10 days, or about 1 day to about 7 days or about 2 days. In certain embodiments, components that select for bacterial cells conjugated with a plasmid, including antibiotics, such as, for example, apramycin.

In one embodiment, the compositions of the subject invention comprise a bacterial culture produced according to the subject methods.

The microbial growth by-product produced by microorganisms of interest may be retained in the microorganisms or secreted into the liquid medium. In another embodiment, the method for producing microbial growth by-product may further comprise steps of concentrating and purifying the microbial growth byproduct of interest. In a further embodiment, the liquid medium may contain compounds that stabilize the activity of microbial growth byproduct.

In certain embodiments, an albofungin compound or derivative thereof can be isolated from the organism that synthesized the compound, purified and analyzed using HPLC to guarantee at least about 85%, about 86%, about 87%, about 88%, about 89%, about 90%, about 91%, about 92%, about 93%, about 94%, about 95% purity.

In certain embodiments, a composition comprising albofungin or a derivative thereof, can be combined with polymer. In certain embodiments, the polymer can coat the albofungin or a derivative thereof and the polymer can be hydrolysable. In certain embodiments, the polymer can be prepared as follows: methyl methacrylate (MMA) and tributylsilyl methacrylate (TBSM) copolymer (PMSMO) was synthesized via radical ring-opening polymerization (see, for example, Zhou et al., 2015). For the production of a 5 wt % of albofungin-based coating, about 0.95 g of PMSMO and about 0.05 g of albofungin can be dissolved in xylene and tetrahydrofuran (v:v=1:2) and mixed vigorously at room temperature. The solution can then be coated on a solid surface, such as, for example, polyvinyl chloride (PVC) panels (4×7 cm$^2$) or glass, and dried at about room temperature (for example, about 18° C. to about 25° C.) for about 1 to about 14 days, about 3 to about 10 days, or about 7 days (Ma et al., 2017). Other coatings with different albofungin concentrations (for example, about 10 wt % or about 15 wt %) can prepared using the same procedure, with the amount of the polymer being adjusted to account for the increase in the albofungin concentration (for example, about 90% PMSMO or about 85% PMSMO, respectively).

In certain embodiment, the antifouling composition comprises a binder, for the adhesion purpose of the antifouling composition to a surface of objects. The binder can be selected from common polymers, acrylic, alkyds, acrylic acid, acrylamide, phenolic, phenolic-alkyd, polyacrylamide, polyurethanes, silicone-alkyd, polyesters, epoxies, vinyl, vinyl acetate-ethylene, vinyl-alkyd, inorganic binders (sodium, potassium methyl silicate, lithium, etc.), organic binders (carbon-based), Tectyl® (Daubert Chemical Company, Inc., Chicago, IL), aliphatic-urethanes, and oil-modified urethanes, or other commercialized binder that have strong adhesion ability. In preferred embodiments, the polymer comprises MMA and TBSM. Further components can be added to enhance performance of the coatings. These additives can be biocides, pigments, buffers, solvent, adhesion-promoting compounds, or other ingredients for specific use.

In certain embodiments, the coating composition of the subject invention comprises a pigment or dye, which can provide the color of paints or other coatings but can additionally protect the surface or object from, for example, UV light. Pigments or dyes can be natural, synthetic, inorganic, or organic. The pigments or dyes can be selected from, for example, titanium dioxide, zin oxide, zinc yellow, yellow dyes, benzidine yellows, chrome oxide green, phthalocyanine green, phthalocyanine blues, ultramarine blue, vermillion, pigment brown 6, red 170, dioxazine violet, carbon black, iron (II) oxide, quartz sand ($SiO_2$), talc, barite ($BaSO_4$), kaoline clay, and limestone ($CaCO_3$).

In certain embodiments, one of the solvents used in the composition is selected from mineral or organic solvents, including, for example, ethanol, butanol, propanol, aliphatic hydrocarbons, alicyclic hydrocarbons, tetrahydrofuran (THF), xylene, toluene, ketones, and/or isopropyl alcohol. In a preferred embodiment, a combination of xylene and THF can be in an v:v ratio of 1:2.

In one embodiment, the composition may further comprise buffering agents including organic and amino acids or their salts. Suitable buffers include, for example, citrate, gluconate, tartarate, malate, acetate, lactate, oxalate, aspartate, malonate, glucoheptonate, pyruvate, galactarate, glucarate, tartronate, glutamate, glycine, lysine, glutamine, methionine, cysteine, arginine and a mixture thereof. Phosphoric and phosphorous acids or their salts may also be used. Synthetic buffers are suitable to be used, but it is preferable to use natural buffers such as organic and amino acids or their salts listed above.

In a further embodiment, pH adjusting agents include potassium hydroxide, ammonium hydroxide, Potassium carbonate or bicarbonate, hydrochloric acid, nitric acid, sulfuric acid or a mixture.

The albofungin-based product may be applied with a composition that promotes adherence of the albofungin-based product to a surface to be treated. The adhesion-promoting substance may be a component of the albofungin-based product or it may be applied simultaneously or sequentially with the albofungin-based product.

Other additives typically used in coating compositions may be used, including water softening agents, sequestrants, corrosion inhibitors, and antioxidants, which are added in amounts effective to perform their intended function. Identification and use of these additives, and amounts thereof, is well within the skill of the art. Suitable water softening agents include linear phosphates, styrene-maleic acid co-polymers, and polyacrylates. Suitable sequesterants include 1,3-dimethyl-2-immidazolidinone; 1-phenyl-3-isoheptyl-1, 3-propanedione; and 2 hydroxy-5-nonylacetophenoneoxime. Examples of corrosion inhibitors include 2-aminomethyl propanol, diethylethanolamine benzotraizole, and methyl benzotriazole. Antioxidants suitable for the present invention include (BHT) 2,6-di-tert-butyl-para-cresol, (BHA) 2,6-di-tert-butyl-para-anisole, Eastman inhibitor O A B M-oxalyl bis(benzylidenehydrazide), and Eastman DTBMA 2,5-di-tert-butylhydroquinone.

Other suitable additives, which may be contained in the formulations according to the invention, include substances that are customarily used for such preparations. The additives can be, for example, carriers, viscosity modifiers, preservatives, tracking agents, biocides, driers, plasticizers, flow control agents, defoamers, emulsifiers, UV stabilizers, anti-skinning agents, texturizers, emulsifying agents, lubricants, solubility controlling agents, preservatives, and/or stabilizers.

Optionally, the product can be stored prior to use. The storage time is preferably short. Thus, the storage time may be less than 60 days, 45 days, 30 days, 20 days, 15 days, 10 days, 7 days, 5 days, 3 days, 2 days, 1 day, or 12 hours. The storage time can be 1 year for maximum, and the preferred temperature for storing can be at about room temperature.

The compositions according to the subject invention can comprise ingredients in amounts effective to clean the surfaces, formations, and equipment, and/or to provide an effective coating to prevent future buildup of contaminants, scale and corrosion.

Use of Albofungin and Derivatives Thereof in Antifouling Compositions

In preferred embodiments, methods are provided for applying an antifouling composition onto a surface that can be fouled with marine invertebrates or bacteria, wherein albofungin or a derivative thereof is applied onto a surface or directly to marine invertebrates' larvae. The use of antifouling composition with the subject invention can provide improvements for antifouling uses. The subject invention is not an exhaustive examination of all applications.

The anti-fouling compositions of the subject invention can be applied to a variety of inorganic or organic object surfaces such as, for example, metals including stainless steel, aluminum, titanium; organic matter including wood, rubber; plastics; minerals; glass; and concrete. The surfaces can be used in a variety of industries including medical device, petroleum, aquaculture, and fishing. The surfaces can be ships, hulls, tubing, pipes, needles, pumps, propellers, buoys, and ropes. The compositions can be applied to objects in a range of temperatures or aquatic environments. The antifouling compositions can be added to a traditional coating product such as a paint, stain, adhesive, primer, sealant, finish, varnish, polish, lacquer, an anti-fouling substance, and/or an anti-abrasive substance.

In certain embodiments, the albofungin-based compositions can inhibit the settlement or formation of marine organisms. These organisms can include microscopic or macroscopic organisms, including bacteria, algae, and marine invertebrate larvae. In certain embodiments, the albofungin-based compositions can inhibit the growth of bacteria and/or the formation of biofilms.

In certain embodiments, the subject compositions can increase the longevity of the object by preventing or inhibiting fouling by living organisms or non-living substances. The subject invention can be used for preventing or inhibiting deposition from occurring. Dispersal, or dissolution, of organisms or precipitates decreases the concentration of contaminants available on the surface or object. Thus, the present invention allows for delaying or completely removing the necessity for preventative maintenance related to removing precipitates and deposits, as well as the need for replacing or repairing equipment parts. The subject coating composition can further be applied for the dispersal of scale buildup in, for example, storage and transportation tanks, tankers, ships, pipelines and flowlines, concrete, asphalt, and metals without need for mechanical cleaning solutions or toxic solvents.

In certain embodiments, the methods are used to clean a surface, wherein the surface is equipment or devices in need of decontamination, defouling, and/or unclogging. Advantageously, the methods of the subject invention can be used to improve overall productivity of an industrial operation or a piece of equipment by improving the maintenance and proper functioning of equipment.

The composition can be applied to the surface by spraying using, for example, a spray bottle or a pressurized spraying device. The composition can also be applied using a cloth or a brush, wherein the composition is rubbed, spread or brushed onto the surface. Furthermore, the composition can be applied to the surface by dipping, dunking or submerging the surface into a container having the composition therein.

In one embodiment, the material and/or surface can be allowed to soak with the composition thereon for a sufficient time to apply the coating or lift and/or remove the contaminant from the object and/or surface. For example, soaking can occur for at least 5 seconds, 30 seconds, 1 minute, 30 minutes, 60 minutes, 12 hours, 24 hours, 36 hours, 48 hours, or 72 hours or more, as needed.

In one embodiment, the method further comprises the step of removing the composition and contaminant from the surface. This can be achieved by, for example, rinsing or spraying water onto the surface, and/or rubbing or wiping the surface with a cloth until the composition and contaminant have been freed from the surface. Rinsing or spraying with water can be performed before and/or after rubbing or wiping the surface with a cloth.

In another embodiment, mechanical methods can be used to remove the contaminant and/or composition from the surface. For example, an agitator, drill, hammer, or scraper can be used for freeing contaminants from surfaces that are particularly difficult to remove due to, for example, the amount of contaminant or the type of contaminant.

In certain embodiments, albofungin or a derivative thereof can be released from the subject compositions after application to an object and/or surface at a rate of about 140 $\mu g\ cm^{-2}\ day^{-1}$ to about 150 $\mu g\ cm^{-2}\ day^{-1}$.

Materials and Methods

Bacterial Strains and General Experimental Procedures

The strains and plasmids are listed in Table 1. *Staphylococcus* sp. Z01 and *Micrococcus* sp. Z02 were isolated from marine biofilm grown on Petri dishes (Corning Inc., New York, USA) in a subtidal zone (Wang et al., 2020). Firstly, the developed biofilms were scraped off the dishes and diluted 10 and 100 times. Then, they were then spread on marine agar plates (BD Difco 2216, New Providence, NJ, USA) and incubated at 22° C. for 24 h. Colonies of different phenotypes were isolated by observation under a dissecting microscope. The 16S rRNA genes amplicon was performed using 8F/1492R primers (AGAGTTTGATCCTGGCTCAG (SEQ ID NO: 1); CGGTTACCTTGTTACGACTT (SEQ ID NO: 2)), followed by Sanger sequencing in BGI (Beijing, China) to confirm the taxonomy of the isolates. BLAST searches on the NCBI 16S ribosomal RNA sequences database and EzBioCloud database was performed on the obtained sequences to identify the taxonomy of the isolates (Yoon et al., 2017). The 16S rRNA gene sequence of *Micrococcus* sp. has 94.7% of similarity to *Micrococcus yunnanensis*, and that of *Staphylococcus* sp. has 96.2% of similarity to *Staphylococcus warneri*.

Isolation, and structure elucidation of albofungins The culture of *Streptomyces chrestomyceticus* BCC 24770 was extracted with ethyl acetate twice to obtain the crude extract and further dissolved in MeOH and loaded into C18 silica gel column chromatography to get different fractions by an increasing gradient MeOH:$H_2O$ (20:80-100:0). The fractions were further analyzed using high-performance liquid chromatography (HPLC, Waters 2695, Milford, MA, USA) and searched for similar UV patterns of compounds 1-4 as previously reported (She et al., 2021). The compounds in the fractions were dried and injected into semi-preparative HPLC for purification. The purity of compounds was analyzed by HPLC, and the structures were determined by Bruker NMR spectrometers (Bruker, Billerica, MA, USA).

Assessment of Biofilm Formation by MTT Assay.

The ability of the bacteria to form static biofilms was tested. Marine bacteria were cultured overnight in marine broth at 22° C. with 220 rpm agitation (*Pseudomonas pachastrellae* MCCC 1A01390, *Sulfitobacter pontiacus* MCCC 1A04899 and *Psychrobacter nivimaris* MCCC 1A 11723) and at 30° C. (*Staphylococcus aureus* B04, *Staphylococcus* sp. Z01 and *Micrococcus* sp. Z02) and then diluted to $10^7$ CFU $mL^{-1}$ in marine broth supplemented with 1% of glucose; pathogenic bacteria was cultured overnight in LB broth with 1% glucose with 220 rpm at 37° C. Afterwards, 200 µL of the diluted solution were added to each well of a 96-well plate (Corning Inc., New York, USA) and was then incubated at 22° C. or 30° C. for 24 h. The culture medium, planktonic cells and loosely adhered bacteria were removed by dual washing with a phosphate-buffered saline (PBS) buffer, and the firmly attached bacteria were incubated with 20 µL of MTT (5 mg $mL^{-1}$) at 37° C. for 3 h. The supernatant was discarded, and formazan was dissolved in 150 µL of DMSO. Absorbance was measured using the Multiskan™ FC microplate photometer (Thermo Fisher Scientific, Waltham, USA) under 570 nm, and MRSA ATCC 43300 was used as a positive control. All the experiments were performed in triplicate.

Antibacterial Assay and Antibiofilm Formation Assay

The antibacterial activities of albofungins were tested following specific protocols (She et al., 2020). Marine broth was used as the test medium for the marine bacteria, and the MHB broth was used as the test medium for the pathogenic bacteria. The plate was kept at 22° C. or 30° C. overnight, and the minimum inhibitory concentration (MIC) is the lowest concentration that the drug prevents the visible growth of bacteria. The bacteria which have successfully formed biofilms were further used for antibiofilm formation assays. Different concentrations of albofungin compounds were added to each well. Biofilm formation was assessed through the MTT assay as previously described. The minimum biofilm inhibitory concentration ($MBIC_{90}$) refers to the lowest concentration of a drug to effectively inhibit 90% of the biofilm formation. Data were analyzed using one-way ANOVA to detect significant differences and standard deviation (SD) was calculated using GraphPad Prism 9. All the assays were performed in triplicate.

Collection, Culturing, and Anti-Larval Settlement Bioassay of Barnacle *A. amphitrite* Larvae and Bryozoan *B. neritina* Larvae

*A. amphitrite* adults were collected from Pak Sha Wan Pier, Hong Kong (22° 38'N, 114° 28'E) and after keeping in the dark for 24 h, a light source was used to stimulate the larval release. Within 1 h, the larvae were collected and cultured in 0.22 μm filtered seawater with a daily diet of *Chaetoceros gracilis* Schutt at 1×10⁶ cells mL⁻¹ until their growth into cyprids, which were used for the anti-larval settlement bioassay. The bryozoan *B. neritina* adults were collected from a fish farm in Pak Shek Kok, Hong Kong (22° 43'N, 114° 20'E) and kept in flow-through seawater for no more than 7 days before use. The larvae were released within 30 minutes before the bioassay as described (Xu et al., 2010). The bioassay was conducted in a 24-well polystyrene tissue culture plate with 15-20 larvae in each well. 0.1% of DMSO in filtered seawater (FSW), and 0.625, 1.25, 2.5, 5, 10, 20, and 40 μg mL⁻¹ albofungin concentrations were tested in triplicate. In each well, 1 mL of FSW containing 15-20 larvae and 1 mL of albofungin solution of different concentrations. The plate was kept for 48 h at 25° C. (bryozoan *B. neritina* larvae were kept for 3 h). The wells with 0.1% of DMSO in FSW served as a negative control, and butenolide was used as a positive control. The number of attached, swimming, and dead larvae were counted under an Olympus optical microscope (Olympus Corporation, Tokyo, Japan). The settlement rate was calculated as the ratio of settled larvae to the total number of larvae in each well, and the death rate was calculated as the ratio of dead or missing larvae to the total number of larvae in each well. Half maximal effective concentration ($EC_{50}$) and half lethal concentration ($LC_{50}$) were determined for each compound, and the ratio of $LC_{50}/EC_{50}$ was used to evaluate the toxicity of the antifoulant. Experiments were performed in triplicate. Data were analyzed by one-way ANOVA to detect significant differences in the larval settlement, and SD was calculated by GraphPad Prism 9.

Construction of Activator Overexpressed *S. chrestomyceticus* and Analysis of Albofungin Production The overexpression plasmids were constructed as follows. Gene sequences were obtained by PCR using the primers listed in Table 2 with the genomic DNA of *S. chrestomyceticus* as the template. Each PCR amplicon was ligated into the linear vector pPWW50a digested with NdeI and SpeL. All the constructed plasmids were confirmed by DNA sequencing, introduced into *E. coli* ET12567/pUZ8002, and conjugated to *S. chrestomyceticus* BCC 24770 following a previous protocol (Gust et al., 2003). The conjugants were collected and grown on a selective plate containing apramycin and nalidixic acid. After 3 days, total DNA was extracted using Chelex 100 resin (Bio-Rad, Hercules, USA) and PCR amplification for the positive conjugants (using primers pPWW50a-check-F and pPWW50a-check-R). The positive conjugants of *S. chrestomyceticus* 24770/pPWW-alb22 and *S. chrestomyceticus* 24770/pPWW-alb45 and parental strain *S. chrestomyceticus* 24770/pPWW were inoculated into seed medium (4 g L⁻¹ glucose, 4 g L⁻¹ yeast extract, 10 g L⁻¹ malt extract, and pH being adjusted to 7.0-7.4) with apramycin (50 μg mL⁻¹) and grown for 2 days. Afterwards, 1% of the preculture was added into the fermentation medium (4 g L¹ glucose, 4 g L⁻¹ yeast extract, 10 g L⁻¹ malt extract, and pH being adjusted to 7.0-7.4) with or without apramycin (50 μg mL¹) and grown for 9 days in the 250 mL shaking flasks. The fermentation products were further analyzed by HPLC. The production of albofungin was calculated according to the standard curve (FIG. 4D). *S. chrestomyceticus* samples were collected and washed using autoclaved water at the end of third day of fermentation and immediately frozen at −80° C. RNA samples were prepared using Trizol Reagent (Invitrogen, Waltham, USA) following the manufacturer's instructions. A HiScript III All-in-one RT SuperMix Perfect for qRT-PCR kit (Vazyme, Nanjing, China) was used to remove genomic DNA and synthesize cDNA. The qRT-PCR analysis was performed on Roche Diagnostics LightCycler 480 Instrument II Real-time PCR System using LightCycler® 480 SYBR Green I Master (Roche, Basel, Switzerland). The primers used are listed in Table 2. The GAPDH gene (glyceraldehyde-3-phosphate dehydrogenase) was used as an internal control, and the relative expression levels of alb22 and alb45 were normalized to GAPDH. Each transcript was performed in triplicate and repeated for three independent biological replicates in qRT-PCR. The relative fold changes in the expression level of each gene were calculated using the 2-ΔΔCT method (Livak and Schmittgen, 2001). The p-value is computed using Student's t-test.

Albofungin Based Coating Preparation and Release Rate Measurement

Around 1 g of albofungin compound was isolated, purified and analyzed using HPLC to guarantee over 95% purity. Albofungin-based hydrolysable and degradable copolymer coating was prepared as follows: methyl methacrylate (MMA) and tributylsilyl methacrylate (TBSM) copolymer (PMSMO) was synthesized via radical ring-opening polymerization (Zhou et al., 2015). For 5 wt % of albofungin-based coating, 0.95 g of PMSMO and 0.05 g of albofungin were dissolved in xylene and tetrahydrofuran (v:v=1:2) and mixed vigorously at room temperature. The solution was then coated on the PVC panels (4×7 cm²) and dried at room temperature for 7 days (Ma et al., 2017). Other coatings with different albofungin concentrations (10 and 15 wt %) were prepared using the same procedure. The coating with PMSMO only was used as a positive control. Each concentration was prepared for three biological replicates. The field test was conducted from March to April 2021 in a fish farm at Yung Shue O, Hong Kong (22° 24'N, 114° 21'E), which was heavily fouled all year round. The PVC panel was submerged into seawater at a depth of 0.5 meters for 2 months, retrieved, washed with seawater, and photographed. The area covered by biofoulers was calculated by Image J (Fiji-2.2.0) (Schindelin, et al., 2012). One-way ANOVA was used to compare the albofungin-coated panels and the control panels. The release rate of albofungin under static conditions was determined by measuring the compound concentration with HPLC. Albofungin-based coatings were applied onto a PVC panel (20×75 mm²) and submerged in artificial seawater (ASW). After 7 days, the panel was transferred to an individual container with 100 mL of ASW. After 24 h of immersion, 10 mL of the seawater was taken out of the container and extracted with the same volume of ethyl acetate three times. After drying under the SpeedVac vacuum concentrators, the extracts were dissolved in 100 μL of methanol and then subjected to HPLC using a reversed-phase system (Waters 2695) with a Phenomenex Luna C18 column connected to a UV detector at 300 nm. The unique UV absorption of albofungin and retention time were determined, with the amount being calculated from the established standard curves using peak areas plotted against known standard quantities.

Nucleic Acid Extractions, 16S rRNA Amplicon Sequencing, and Analysis

The field test for biofilm formation was performed in Pak Sha Wan Pier, Hong Kong (22° 38'N, 114° 28'E). Glass slides with albofungin/copolymer coatings were submerged at a depth of 0.5 meter from sea surface for 12 days and immediately transported into the laboratory for biofilm extraction. The biofilm was scraped using a sterilized cotton swab and was collected in TE buffer (10 mM Tris-Cl; 0.5 mM EDTA). The samples were centrifuged at 4000 rpm for 5 mins and the supernatant was discarded. Bacteria genomic DNA extraction kit (TIANGEN, Beijing, China) was used to extract the genomic DNA, and the quality was confirmed through BioDrop (Biochrom Ltd, Cambridge, UK). The 16s rRNA amplicon sequencing of the extracted genomic DNA was performed using an Illumina paired-end platform to generate 250 bp paired-end raw reads (Raw PE) in Novogene (Beijing, China). Sequence data of six samples were subjected to quality control and analyzed using the microbial ecology community software program Mothur (Schloss et al., 2019). Low-quality reads (average quality score <25) and reads with incorrect length (no shorter than 400 bp and no longer than 430 bp), any ambiguous base, and homopolymers longer than 8 bp were removed. Chimeric sequences were identified and removed by Chimera.uchime in Mothur package. The remaining high-quality sequences were then clustered into the operational taxonomic unit (OTUs) at 97% similarity. Singletons and doubletons were removed before downstream analysis. Taxonomic annotation was performed using Classify. OTU in Mothur with Silver.132 database.

All patents, patent applications, provisional applications, and publications referred to or cited herein are incorporated by reference in their entirety, including all figures and tables, to the extent they are not inconsistent with the explicit teachings of this specification.

Following are examples that illustrate procedures for practicing the invention. These examples should not be construed as limiting. All percentages are by weight and all solvent mixture proportions are by volume unless otherwise noted.

Example 1—The Structures and Bioactivity of Albofungins

Four compounds (1-4) in total were isolated: that are, albofungin (1), its demethoxy product, albofungin A (2), its monochlorinated derivative, chloroalbofungin (3), and its deaminated derivative, chrestoxanthone A (4) (FIG. 1). All of them were extracted at a high amount from the cultures of S. chrestomyceticus BCC 24770 (Bunyapaiboonsri et al., 2016; She et al., 2021). As previously reported, albofungins showed various biological activities such as potential antibiotics against 'ESKAPE pathogens', antifungal activities against pathogenic fungi, and antitumor activities against different cancer cell lines (Bunyapaiboonsri et al., 2016; She et al., 2021). The strong antibiotic effect of albofungins against Gram-positive bacteria was linked to the presence of a hydrazine group (She et al., 2021), and its mode of action was determined to be an inhibitor of bacterial transglycosylases (Wu et al., 2018). In addition, albofungin A inhibited cancer cell proliferation by inducing cellular apoptosis (She et al., 2021). Owing to their prominent and diverse bioactivities, albofungins might have great potential in biofilm control and thus anti-microfouling activities.

Example 2—Antibiofilm Activities of Albofungins

The antibiofilm activities of albofungins (1-4) was evaluated using 6 representative marine bacteria, either isolated from subtidal marine biofilms or described as dominant primary colonizers of submerged surfaces, including Staphylococcus aureus, Micrococcus sp., Staphylococcus sp., Sulfitobacter pontiacus, Pseudomonas pachastrellae, and Psychrobacter nivimaris and pathogenic bacteria including MRSA ATCC 43300, Acinetobacter baumannii B-65371, Enterobacter cloacae NRRL-B-425, and Escherichia coli k12. The results showed that albofungins (1-4) strongly prevented the biofilm formation of all selected strains (Tables 3 and 4). The $MBIC_{90}$ values of compounds 1-4 against the biofilm formation of Gram-positive bacteria were at a low micromolar range (Table 3). More specifically, biofilm formation of S. aureus, Micrococcus sp., and Staphylococcus sp. was almost completely inhibited (>90%) by compounds 1-4 at concentrations ranging from 0.03 μg $mL^{-1}$ to 0.5 μg $mL^{-1}$, 0.06 μg $mL^{-1}$ to 0.5 μg $mL^{-1}$, and 1.25 ng $mL^{-1}$ to 0.2 μg $mL^{-1}$, respectively (FIGS. 2A-2E). As for Gram-negative bacterial strains, compounds 1 and 2 showed strong antibiofilm activities against S. pontiacus, and P. pachastrellae with $MBIC_{90}$ ranging from 0.02 μg $mL^{-1}$ to 0.50 μg $mL^{-1}$, whereas compounds 3 and 4 displayed only moderate activities against these bacteria at a concentration of 10-20 μg $mL^{-1}$ (Table 4). All of the compounds, however, showed no apparent biofilm inhibition effects against P. nivimaris at concentrations of less than 20 μg $mL^{-1}$. Additionally, compounds 1-4 exhibited antibacterial activities against both Gram-positive bacteria with MIC ranging from 0.8 ng $mL^{-1}$ to 50 ng $mL^{-1}$ and Gram-negative bacteria with MIC ranging from 0.008 μg $mL^{-1}$ to 20 μg $mL^{-1}$ (Tables 5 and 6). These results implied that the biofilm inhibition of albofungins is possibly owing to the inhibition of bacterial growth. As compounds 1-4 exhibited antibacterial activities against the pathogenic bacteria in our previous study, so we evaluated their antibiofilm activities in the present study. The results showed that compounds 1 and 2 had strong antibiofilm activities at a low micromolar range towards all the bacteria, especially MRSA, and compound 4 showed antibiofilm activities against MRSA and A. baumannii from 0.13 μg $mL^{-1}$ to 2.5 μg $mL^{-1}$ (Table 7). Consistent with the antibacterial results, compounds 1 and 2 that contain the hydrazine group but without a chlorinated ring A, exhibited stronger antibiofilm activities than compounds 3 and 4. According to the preliminary structure-activity relationship analysis, the existence of a hydroxyl group in ring F in compound 2, instead of a methoxy group in comparison with compound 1, allows for higher antibiofilm activities against Gram-negative bacteria.

TABLE 1

| Bacteria strains and plasmids. | | |
|---|---|---|
| Strain or plasmid | Characteristics | Reference |
| Escherichia coli TOP10 | Cloning host | (O'Sullivan et al., 2001) |
| E. coli ET12567/pUZ8002 | Streptomyces conjugation | (Guan and Pettis, 2009) |
| MCCC 1A01390 Pseudomonas pachastrellae | Biofilm formation strain | Marine Culture Collection of China (MCCC) |
| MCCC 1A04899 Sulfitobacter pontiacus | Biofilm formation strain | Marine Culture Collection of China (MCCC) |

TABLE 1-continued

Bacteria strains and plasmids.

| Strain or plasmid | Characteristics | Reference |
|---|---|---|
| MCCC 1A11723 *Psychrobacter nivimaris* | Biofilm formation strain | purchased from the Marine Culture Collection of China (MCCC) |
| *Micrococcus* sp. Z02 | Biofilm formation strain | This study |
| *Staphylococcus aureus* B04 | Biofilm formation strain | Culture collection of our laboratory |
| *Staphylococcus* sp. Z01 | Biofilm formation strain | This study |
| MRSA ATCC 43300 | Biofilm formation strain | Culture collection of our laboratory |
| *Acinetobacter baumannii* B-65371 | Biofilm formation strain | Culture collection of our laboratory |
| *Enterobacter cloacae* NRRL-B-425 | Biofilm formation strain | Culture collection of our laboratory |
| *Escherichia coli* k12 | Biofilm formation strain | Culture collection of our laboratory |
| *Streptomyces* strains | | |
| *Streptomyces chrestomyceticus* BCC 24770 | Parental strain to produce albofungin | |
| 24770/pPWW-alb45 | Overexpression strain | This study |
| 24770/pPWW-alb22 | Overexpression strain | This study |
| Plasmids | | |
| pPWW50a | Cloning and expression vector | (Malit et al., 2021) |
| pPWW-alb75 | pPWW50a with alb45 expression under the control of the strong constitutive promoter ermE*p | This study |
| pPWW-alb22 | pPWW50a with alb22 expression under the control of the strong constitutive promoter ermE*p | This study |

TABLE 2

Primers used in this study.

| Primers | Sequence (5'-3') |
|---|---|
| pPWW50a-alb22-F | GGAATTCCATatggagcgcgacacc (SEQ ID NO: 1) |
| pPWW50a-alb22-R | GACTAGTtcagaacggccaggtctcct (SEQ ID NO: 2) |
| pPWW50a-alb45-F | GGAATTCCATatggacatcagcgtactggg (SEQ ID NO: 3) |
| pPWW50a-alb45-R | GACTAGTtcagccggcccggaccag (SEQ ID NO: 4) |
| qPCR-GAPDH-F | TCTTCACCAAGAAGGCCGAC (SEQ ID NO: 5) |
| qPCR-GAPDH-R | TACTTGTCCTGGTTGACGCC (SEQ ID NO: 6) |
| qPCR-alb45-F | GTCTCGACCTCCTCACTGGT (SEQ ID NO: 7) |
| qPCR-alb45-R | GTGCGCAGTTGGAGGATGTA (SEQ ID NO: 8) |
| qPCR-alb22-F | GTCAGCAGTTCGTCGGTGAC (SEQ ID NO: 9) |
| qPCR-alb22-R | CCCACCACACTCGGCTACAC (SEQ ID NO: 10) |
| pPWW50a-check-F | AACCATGAGAGGAGAGCGGG (SEQ ID NO: 11) |
| pPWW50a-check-R | TGAGCGAGGAAGCGGAAGAG (SEQ ID NO: 12) |

TABLE 3

Biofilm inhibition assay towards Gram-positive marine bacteria of albofungins (1-4). The results are represented as minimum biofilm inhibitory concentration (MBIC) in ng mL$^{-1}$.

| Gram-positive bacteria | *Micrococcus* sp. Z02 | *Staphylococcus aureus* 04 | *Staphylococcus* sp. Z01 |
|---|---|---|---|
| | MBIC$_{90}$ (ng mL$^{-1}$) | | |
| Albofungin (1) | 31.25-62.50 | 15.63-31.25 | 0.63-1.25 |
| Albofungin A (2) | 62.5-125 | 15.63-31.25 | 0.63-1.25 |
| Chloroalbofungin (3) | 250-500 | 250-500 | 100-200 |
| Chrestoxanthone A (4) | 125-250 | 62.5-125 | 5-10 |

TABLE 4

Biofilm inhibition assay towards Gram-negative marine bacteria of albofungins (1-4). The results are represented as minimum biofilm inhibitory concentration (MBIC) in μg mL$^{-1}$.

| Gram-negative bacteria | MCCC 1A04899 *Sulfitobacter pontiacus* | MCCC 1A01390 *Pseudomonas pachastrellae* | MCCC 1A11723 *Psychrobacter nivimaris* |
|---|---|---|---|
| | MBIC$_{90}$ (μg mL$^{-1}$) | | |
| Albofungin (1) | 0.13-0.25 | 0.25-0.50 | 10-20 |
| Albofungin A (2) | 0.02-0.03 | 0.02-0.03 | >20 |
| Chloroalbofungin (3) | 10-20 | >20 | >20 |
| Chrestoxanthone A (4) | 10-20 | >20 | >20 |

TABLE 5

Bacterial growth inhibition towards Gram-positive marine bacteria of albofungins (1-4). The results are represented as minimum inhibitory concentration (MIC) in ng mL$^{-1}$.

| Gram-positive bacteria | *Micrococcus* sp. Z02 | *Staphylococcus aureus* 04 | *Staphylococcus* sp. Z01 |
|---|---|---|---|
| | MIC (ng mL$^{-1}$) | | |
| Albofungin (1) | 3.2 | 3.2 | 0.8 |
| Albofungin A (2) | 6.4 | 6.4 | 0.8 |
| Chloroalbofungin (3) | 50 | 12.5 | 1.6 |
| Chrestoxanthone A (4) | 12.5 | 12.5 | 1.6 |

TABLE 6

Bacterial growth inhibition towards Gram-negative marine bacteria of albofungins (1-4). The results are represented as minimum inhibitory concentration (MIC) in μg mL$^{-1}$.

| Gram-negative bacteria | MCCC 1A04899 *Sulfitobacter pontiacus* | MCCC 1A01390 *Pseudomonas pachastrellae* | MCCC 1A11723 *Psychrobacter nivimaris* |
|---|---|---|---|
| | MIC (μg mL$^{-1}$) | | |
| Albofungin (1) | 0.032 | 0.5 | >20 |
| Albofungin A (2) | 0.008 | 0.12 | >20 |
| Chloroalbofungin (3) | >20 | >20 | >20 |
| Chrestoxanthone A (4) | 20 | >20 | >20 |

TABLE 7

Biofilm inhibition assay towards pathogenic bacteria of albofungins (1, 2, and 4). The results are represented as minimum biofilm inhibitory concentration (MBIC) in μg mL$^{-1}$.

| | MRSA ATCC 43300 | *Acinetobacter baumannii* B-65371 | *Enterobacter cloacae* NRRL-B-425 | *Escherichia coli* k12 |
|---|---|---|---|---|
| | MBIC$_{90}$ (μg mL$^{-1}$) | | | |
| Albofungin (1) | 0.01-0.03 | 0.06-0.13 | 1.25-2.5 | 0.63-1.25 |
| Albofungin A (2) | 0.01-0.03 | 0.13-0.25 | 0.63-1.25 | 0.31-0.63 |
| Chrestoxanthone A (4) | 0.13-0.25 | 1.25-2.5 | >10 | >10 |

Figure 3A:
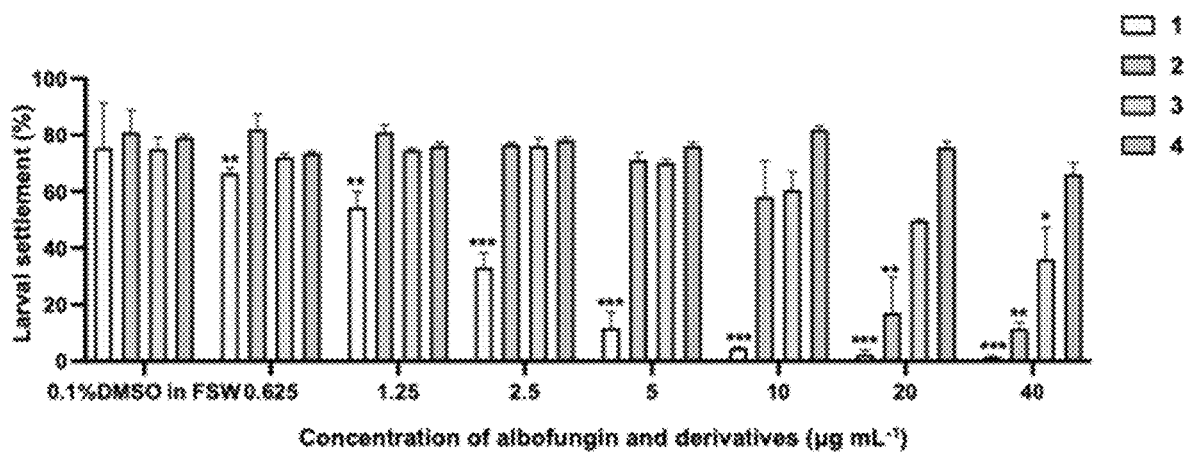
FIGS. 3A-3G shows the antifouling activity of albofungins (1-4) against barnacle *Amphibalanus amphitrite* and bryozoan *Bugula neritina*. Larval settlement rate (FIG. 3A) and larval mortality rate (FIG. 3B) of *A. amphitrite* under the treatment of albofungins 1-4 with concentrations of 0.625 μg mL$^{-1}$ to 40 μg mL$^{-1}$ for 48 hours. Error bars represent SD (n=9 wells from 3 batches of larval cultures). Significant differences were analyzed by one-way ANOVA, *p<0.05, p<0.01, and *p<0.001.
Figures 3B, 3C:
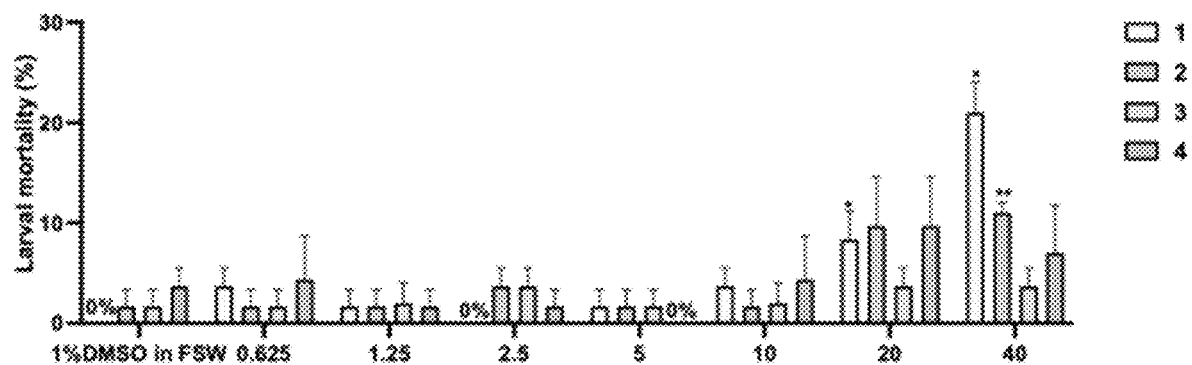
Figure 3D:
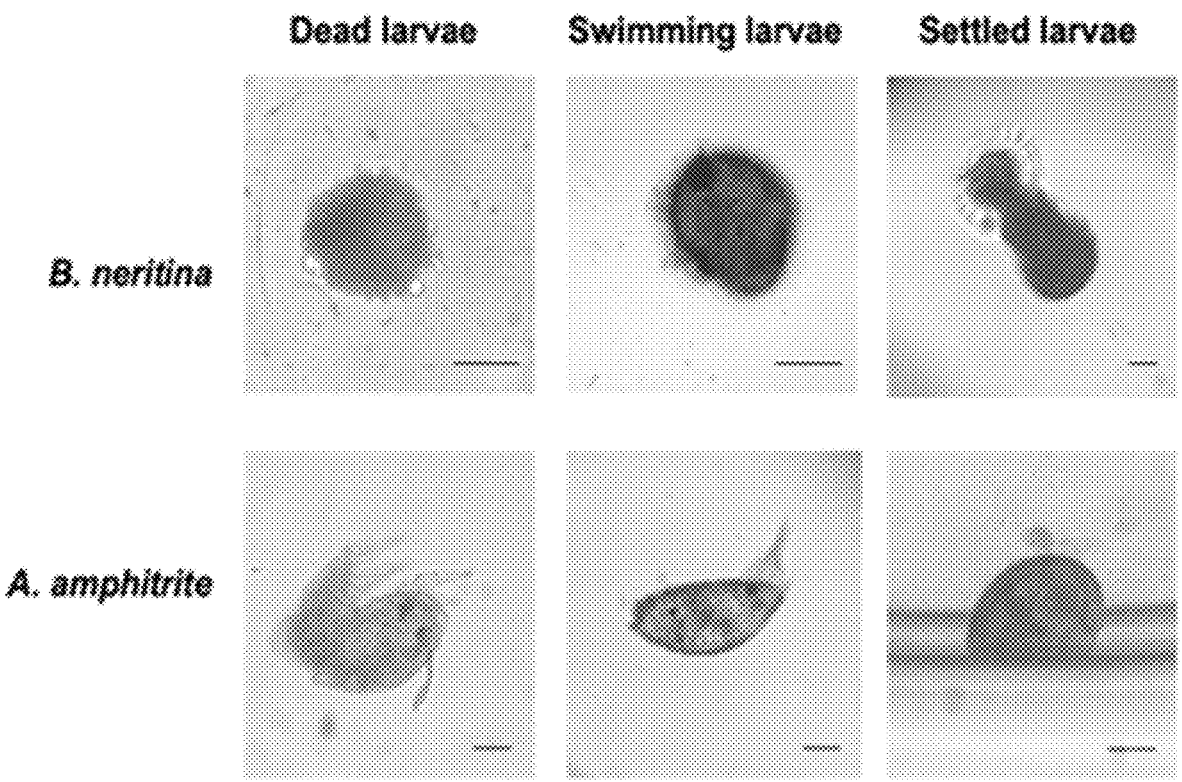
Figure 3E:
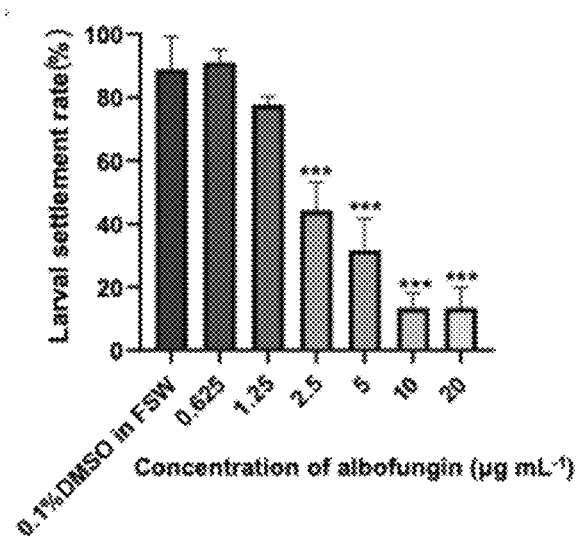
Figure 3F:
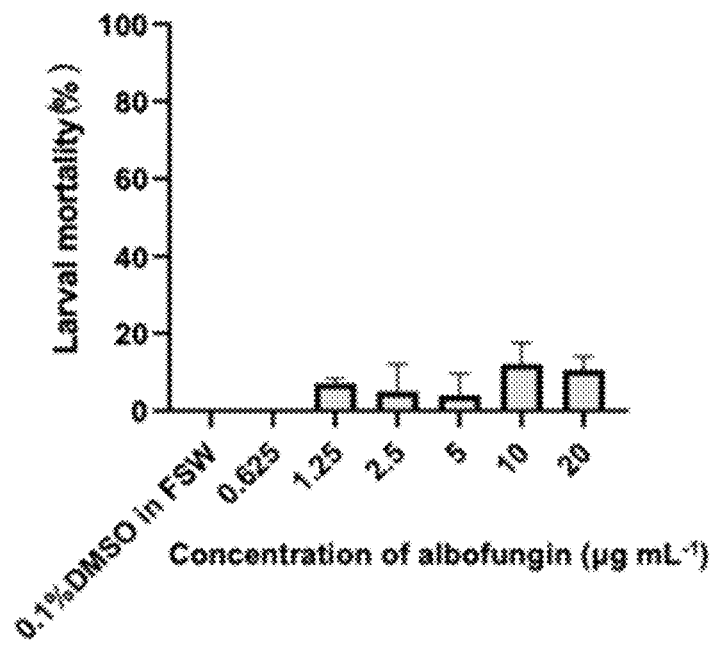
Figure 3G:
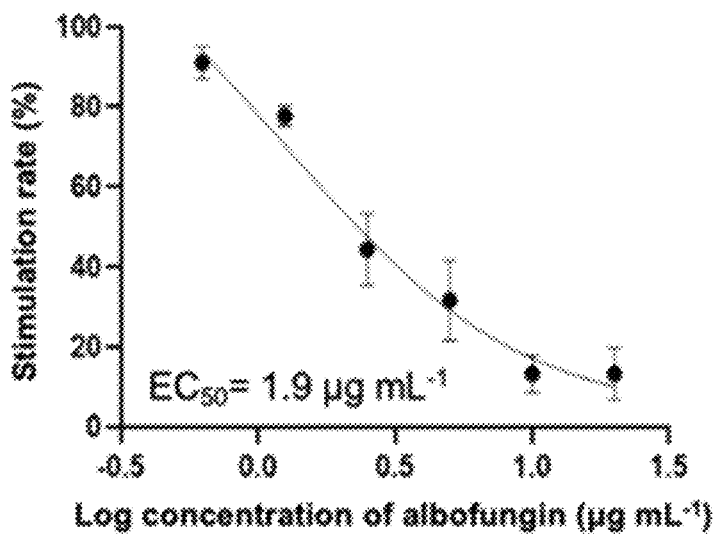

Example 3—Antifouling Activity of Albofungins Against Barnacle *Amphibalanus amphitrite* and Bryozoan *Bugula neritina* Larvae Then the anti-macrofouling activities of albofungins (1-4) against the larval settlement of the barnacle *A. amphitrite* and bryozoan *B. neritina* were evaluated. The results showed that the settlement rate of *A. amphitrite* was significantly lower in the treatments of compounds 1 and 2 than that of the control group (0.1% DMSO in FSW) after 48 h of incubation, whereas compounds 3 and 4 did not cause significant difference from the FSW control group (FIGS. 3A, 3B, and 3D). The larval settlement rate of *A. amphitrite* in 2.5 μg mL$^{-1}$ of compound 1 treatment was 33% (±5.3%), and in 20 μg mL$^{-1}$ of compound 2 treatment was 17% (±12.7%), both of which were significantly lower than that in the FSW control group. With respect to *A. amphitrite*, compound 1 exhibited a strong inhibitory effect with an EC$_{50}$ of 1.6 μg mL$^{-1}$, and compound 2 showed a moderate inhibitory effect with an EC$_{50}$ of 12.2 μg mL$^{-1}$ (FIG. 3C and Table 8). Among these tested compounds, compound I showed equivalent antifouling activity against the larval settlement of *A. amphitrite* to that of butenolide, which is a highly potent antifouling compound according to the EC$_{50}$ value. In particular, albofungins up to 40 μg mL$^{-1}$ had very low lethal effects (FIGS. 3A-3B). Meanwhile, the antifouling activity of compound 1 against the bryozoan *B. neritina* larvae was concentration-dependent and showed no lethal effects at the highest concentration tested as well in the present study (FIGS. 3E-3G). Treatment with 2.5 µg mL$^{-1}$ of compound 1 had 44% (±9.0%) of larval settlement of *B. neritina*, which was significantly lower than that in the FSW control group (FIGS. 3E-3F).

TABLE 8

EC$_{50}$ and LC$_{50}$ of albofungins (1-4) against the barnacle *Amphibalanus amphitrite* and bryozoan *Bugula neritina* larvae.

| compound | EC$_{50}$ (µg mL$^{-1}$) | LC$_{50}$ (µg mL$^{-1}$) | LC$_{50}$/EC$_{50}$ |
|---|---|---|---|
| *Amphibalanus amphitrite* larvae | | | |
| Albofungin (1) | 1.6 | >100 | 62.5 |
| Albofungin A (2) | 12.2 | >100 | 8.2 |
| Chloroalbofungin (3) | 35.0 | >100 | — |
| Chrestoxanthone A (4) | >36.8 | >100 | — |
| Butenolide | 0.9 | >50 | 55.6 |
| *Bugula neritina* larvae | | | |
| Albofungin (1) | 1.9 | >100 | 52.6 |
| Butenolide | 0.5 | >50 | 100 |

Example 4—Overexpression of the Candidate Activator Genes

Figure 4A:
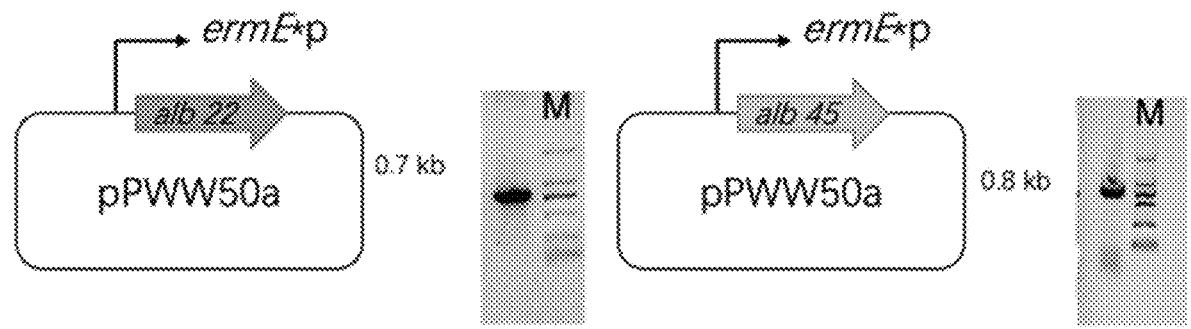
FIGS. 4A-4D shows (FIG. 4A) Construction of overexpression vectors.
Figure 4B:
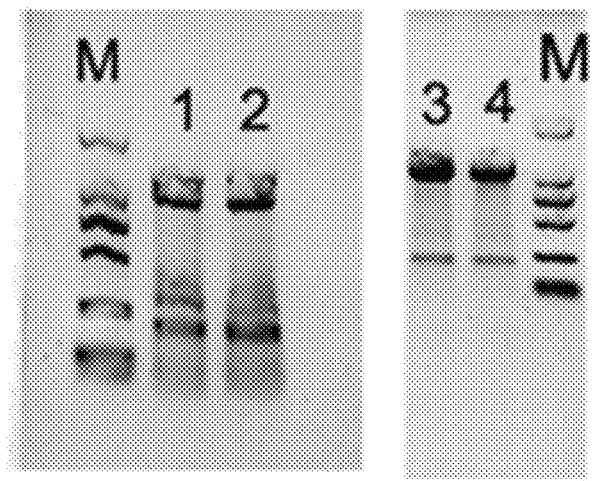
Figure 4C:
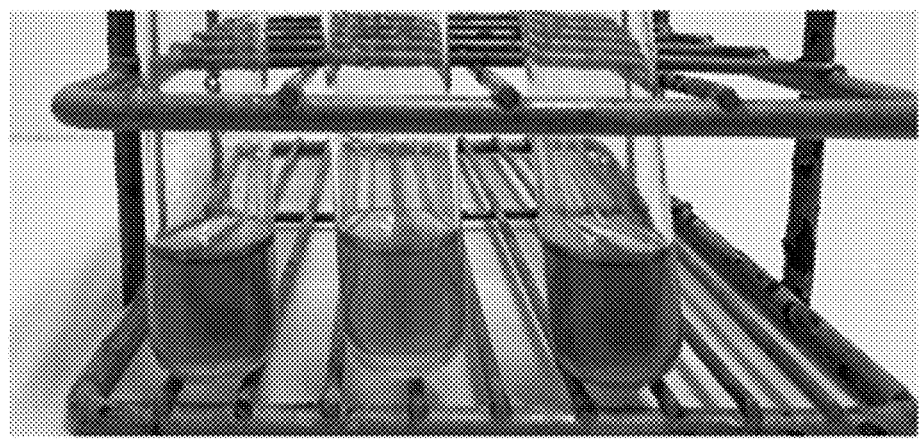
Figure 4D:
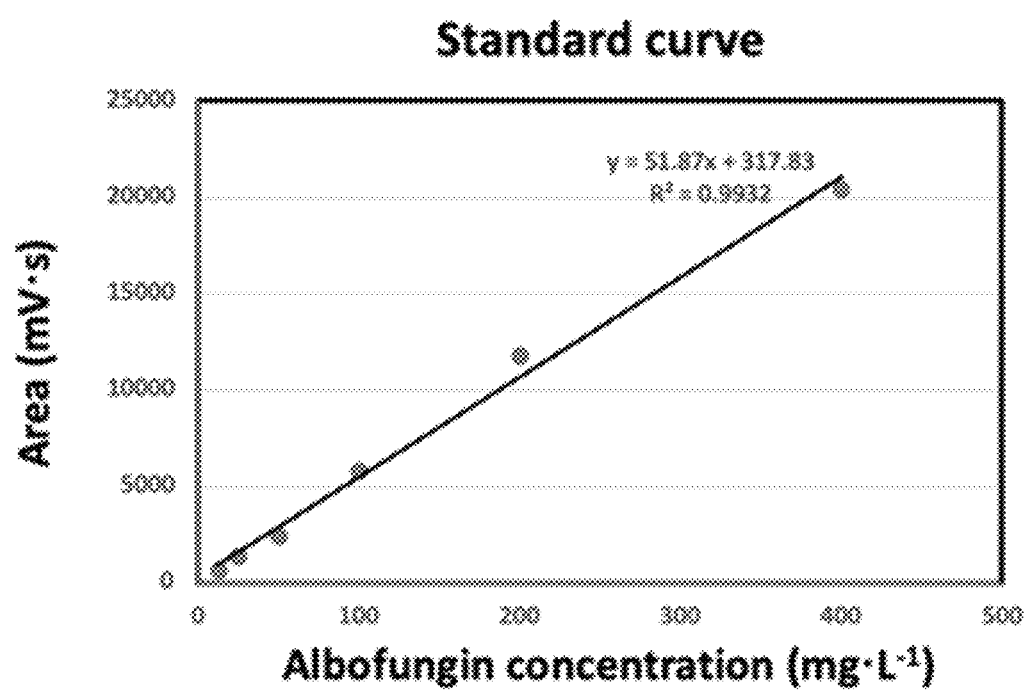
Figure 5A:
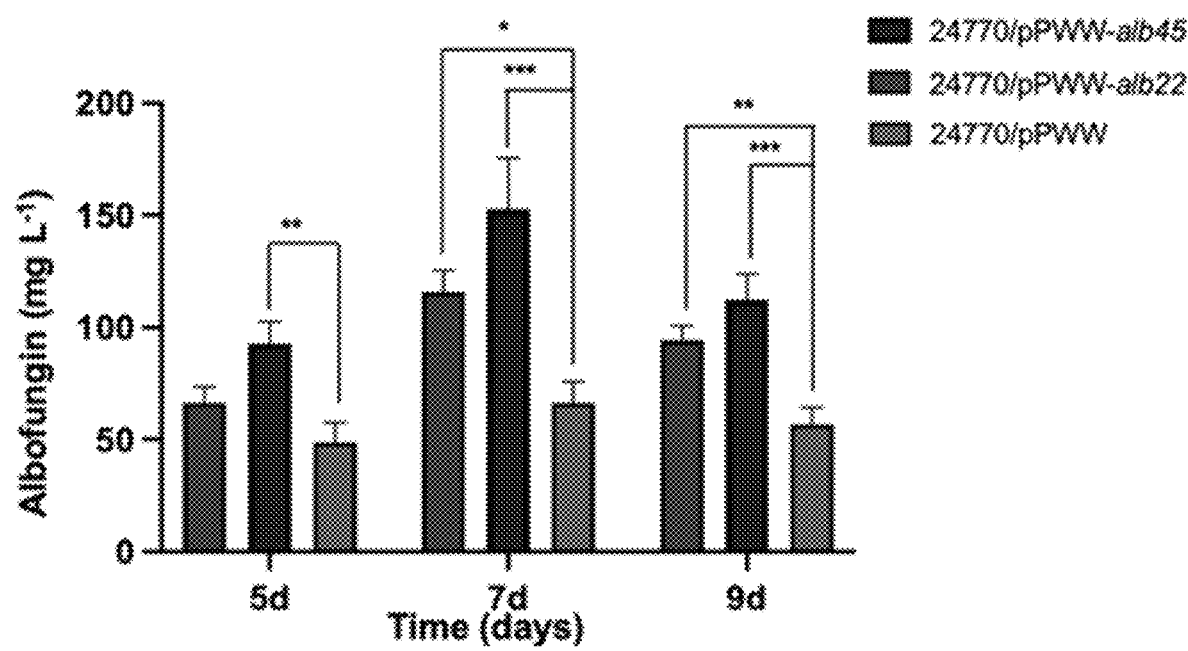
FIGS. 5A-5D shows effects of overexpressed regulators on albofungin production.
Figure 5B:
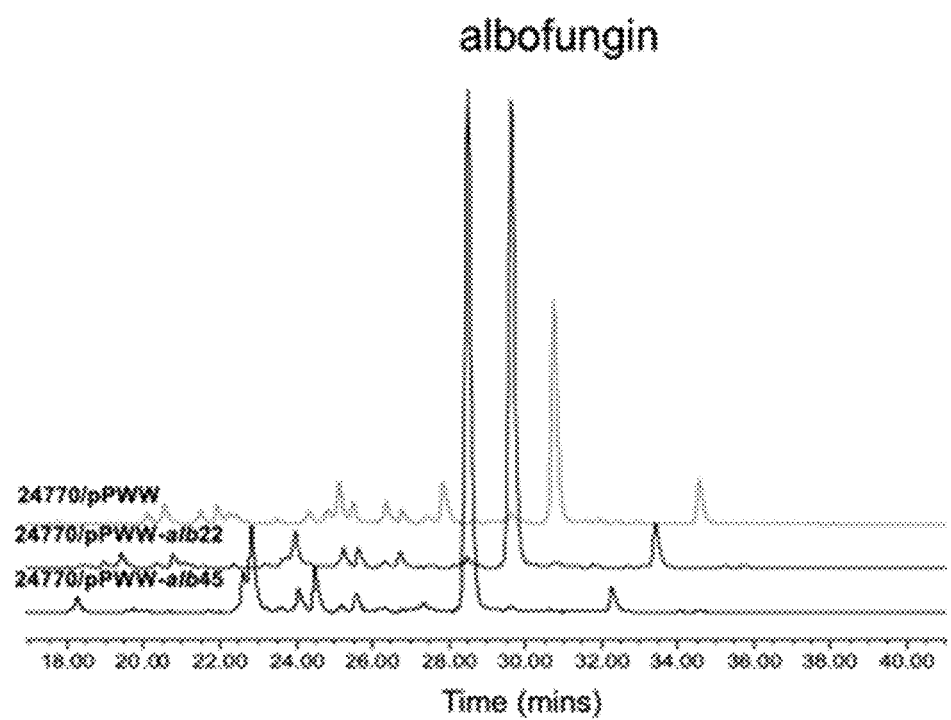
Figure 5C:
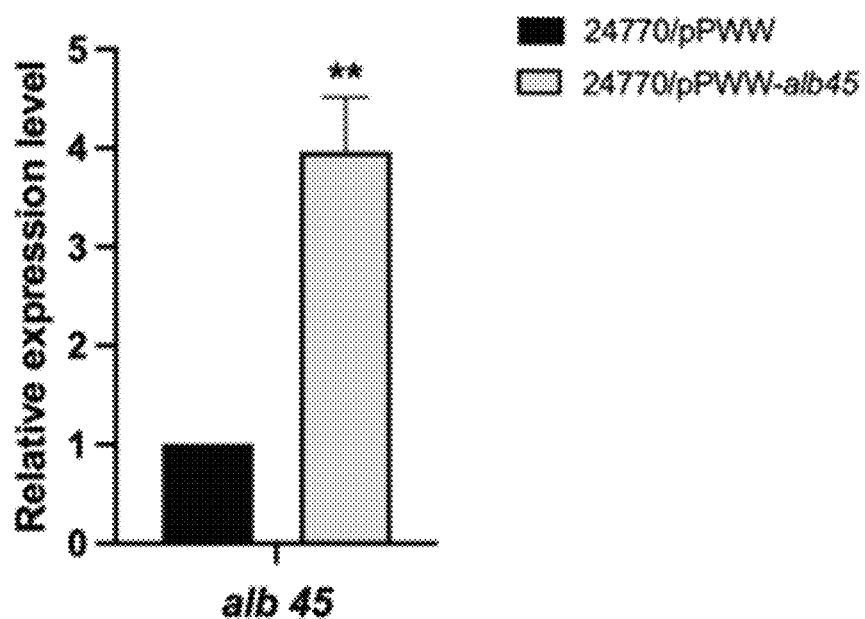
Figure 5D:
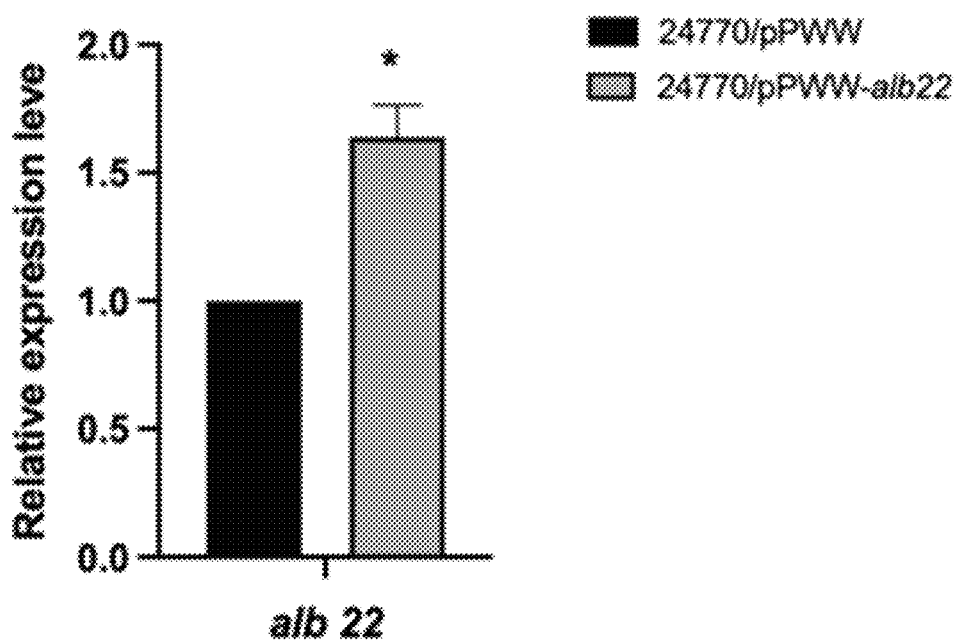

To improve the production of albofungin, transcriptional regulators alb22 and alb45 were manipulated in the *S. chrestomyceticus* BCC24770. Alb22 and alb45 encoded for transcriptional enhancer A (TenA) family regulator and *Streptomyces* antibiotic regulatory protein (SARP) family regulator, which were identified as positive regulators for albofungin biosynthesis (She et al., 2021). Basically, two positive regulators were individually cloned into the pPWW50a plasmid, and their expression was initiated under the control of strong constitutive promoter ermE*p. The resulting constructs were introduced into the wild type *S. chrestomyceticus* BCC24770 to generate overexpression strains 24770/pPWW-alb22 and 24770/pPWW-alb45 (FIGS. 4A-4B). BCC24770 with the empty plasmid was used as a negative control (24770/pPWW). The qRT-PCR analysis revealed that the transcription levels of the two regulatory genes were increased by 0.6-fold and 3.0-fold in the alb22 and the alb45 overexpression strains compared with those in the parental strain (FIGS. 5C-5D). This finding further supported the successful overexpression of these two regulatory genes. Meanwhile, the fermentation results of overexpression strains and parental strain were analyzed using HPLC and the results showed that the overexpression of alb22 and alb45 improved albofungin production by 37% and 91% in comparison with the parental strain after 5 days. Noticeably, after 7 days of cultivation, 24770/pPWW-alb22 strain and 24770/pPWW-alb45 strain produced 115±9.4 and 153±22.7 mg L$^{-1}$ albofungin in parallel fermentations, which were 0.7- and 1.3-fold higher yields than the parental strain (FIGS. 5A-5B), respectively. Because albofungin is a yellow powder, its yield can be indicated by the color of the crude extract. Clearly, the color of crude extract from 24770/pPWW-alb22 and 24770/pPWW-alb45 dissolved in methanol was darker than that of the parental strain (FIG. 4C). Additionally, the overexpression of regulatory genes showed no significant influence on the growth of *S. chrestomyceticus*. These findings suggested 24770/pPWW-alb45 as the preferrable genetically modified strain for albofungin production.

Figure 6A:
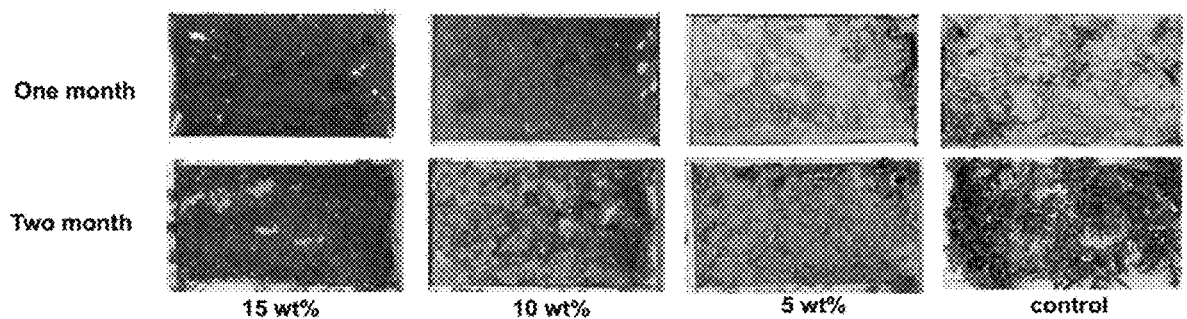
FIGS. 6A-6D shows the antifouling effect of albofungin-based copolymer coating in the field test after two months.
Figure 6B:
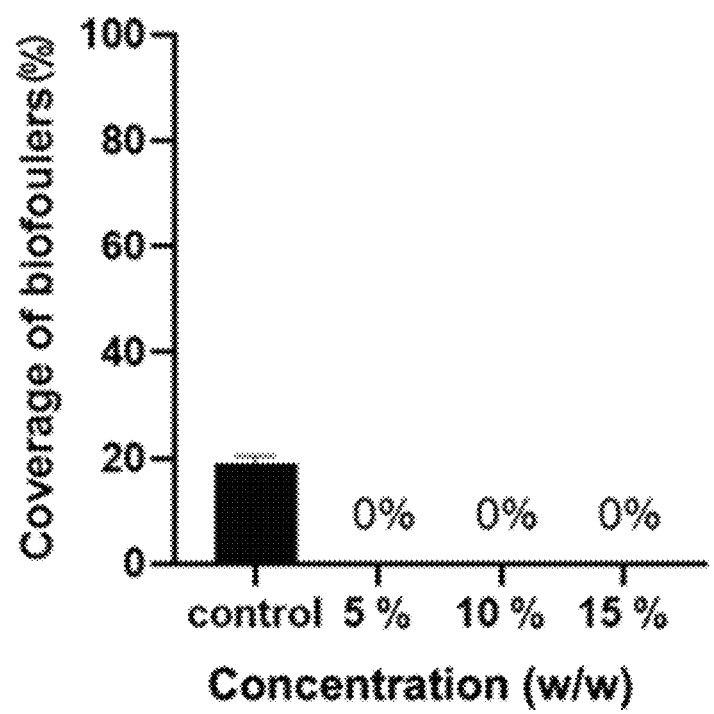
Figure 6C:
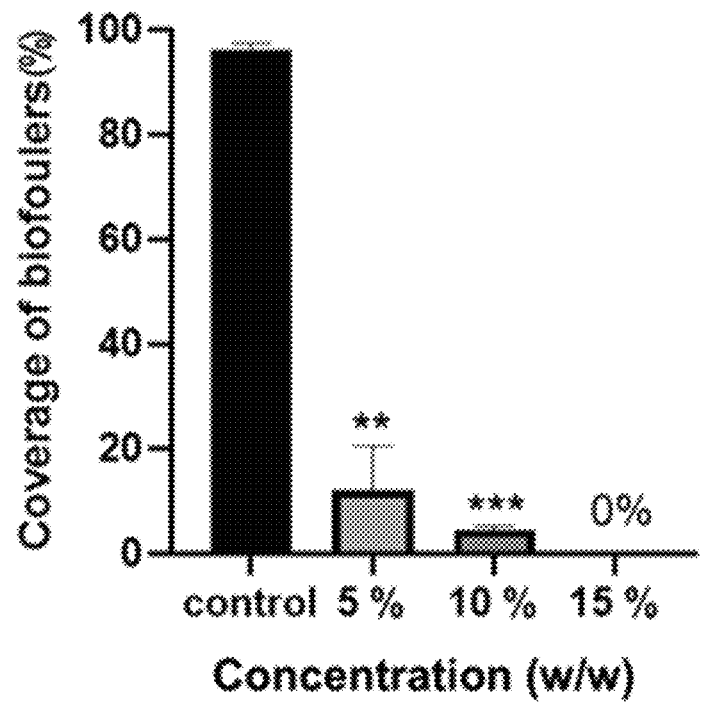

Example 5—Antifouling Efficacy of Albofungin and Degradable Copolymer Coatings in Marine Field Test In our antifouling screening, Albofungin (1) showed remarkable anti-microfouling and anti-macrofouling activities with low toxicity towards the target organisms, meanwhile, large-scale fermentation of albofungin high-yield strain could easily provide a gram-scale amount of the compound under laboratory conditions at a low cost. Thus, the antifouling efficacy of albofungin was assessed in a field study. 1 g of pure albofungin (1) was obtained from 7 liters of *S. chrestomyceticus* 24770/pPWW-alb45 bacterial culture and then incorporated into different antifouling coatings. These coatings were then applied onto PVC panels that were submerged in marine environments for 60 days. Noticeably, almost no macrofoulers settled onto the surfaces of the albofungin-coated PVC panels in all three concentrations (5, 10 and 15 wt %) after 1 month (FIG. 6A), whereas the surface of the negative control group was fouled by the bryozoan *B. neritina* and the polychaete *H. elegans*, which is the most widespread tube building worm in tropical and subtropic regions. After 2 months of submerging in the sea, 96% of the PVC panel surface area was covered by macrofoulers in the control group, whereas the regions fouled in albofungin-coated groups were significantly smaller (FIGS. 6A-6C).

Figure 6D:
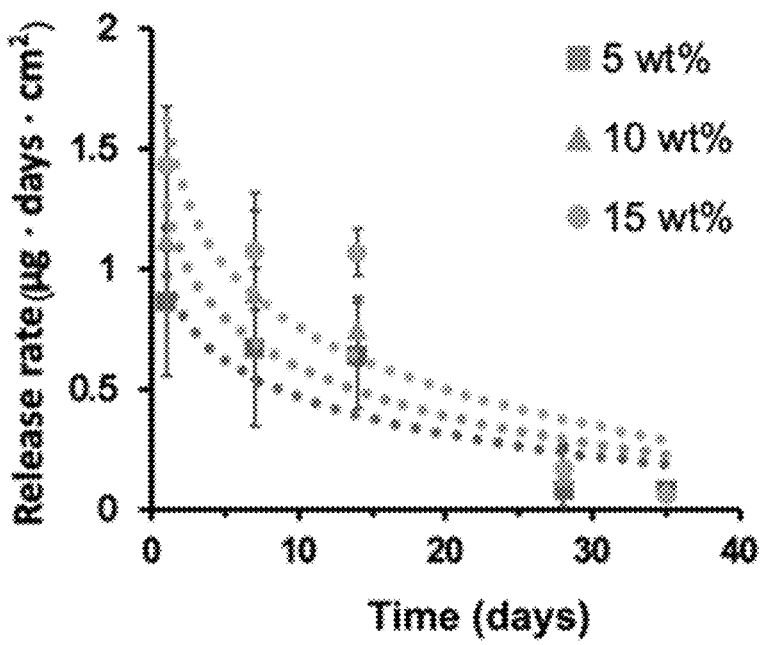

The release rate of albofungin from coatings at different concentrations into artificial seawater was measured within 35 days. Overall, the release rate was low during the whole observation period and was positively correlated with the albofungin concentration. The highest release rate of 15, 10, and 5 wt % of albofungin reached 1.4, 1.1, and 0.86 µg day-1 cm$^{-2}$ on the first day, respectively, and decreased to approximately 0.08 µg day-1 cm$^{-2}$ in a time-dependent manner (FIG. 6D).

Figure 7A:
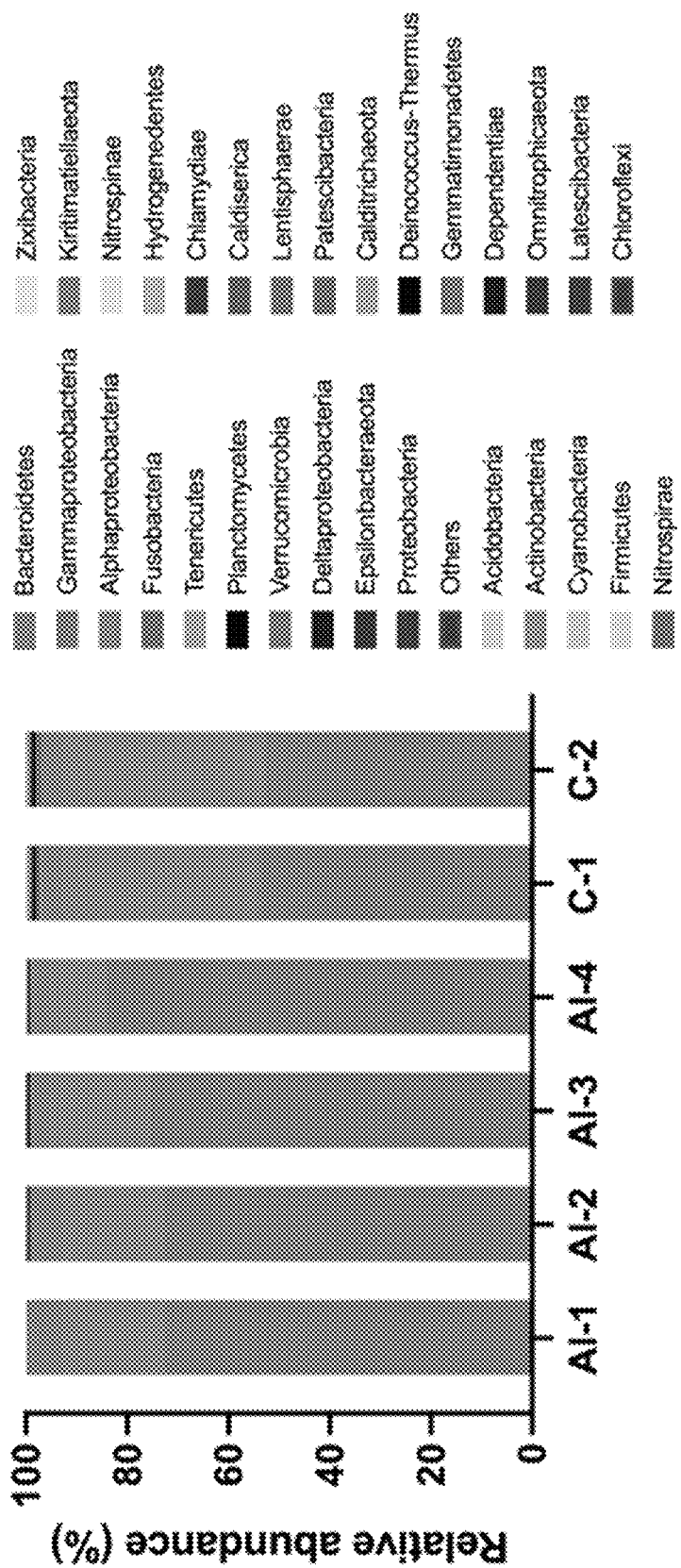
FIGS. 7A-7C shows microbial community structure alteration by albofungin-based copolymer coatings based on 16s rRNA amplicon analysis.
Figure 7B:
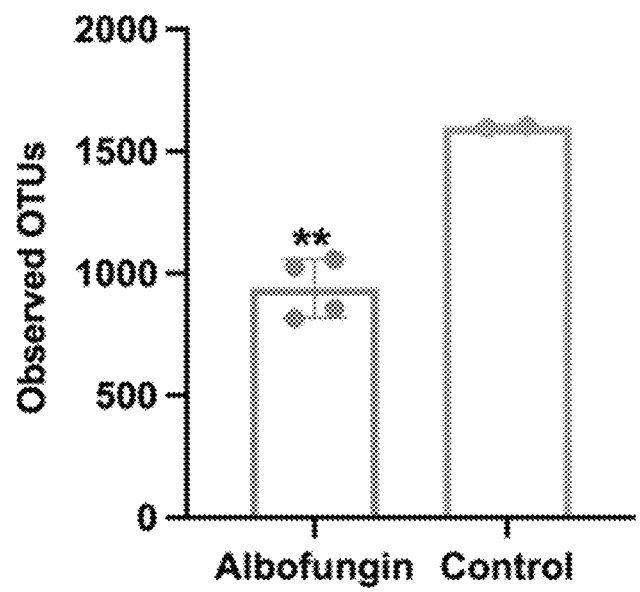
Figure 7C:
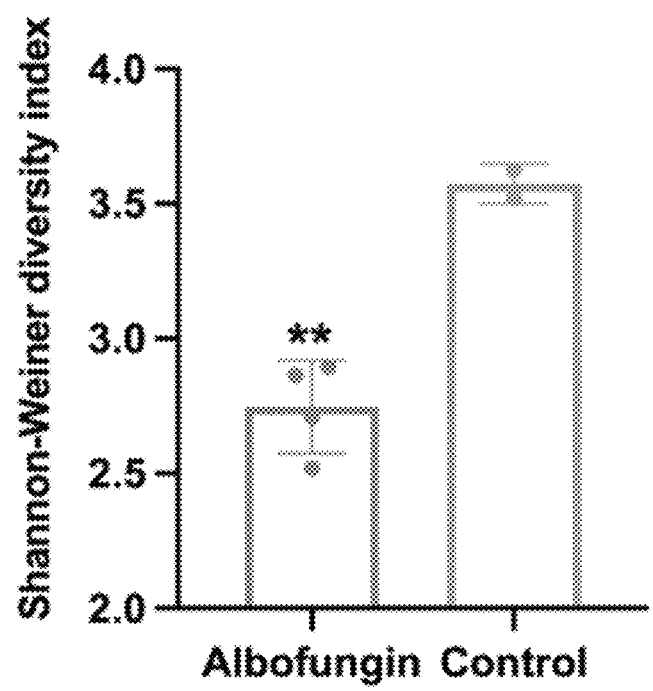

Example 6—Changes in Microbial Community Structure Caused by Albofungin and Degradable Copolymer Coatings Biofilm development on albofungin and degradable copolymer coatings in the field was further examined. During 12 days of observations, the biofilm quickly grew on the panel surfaces in the control group and consisted of diverse microorganisms whereas the diversity of microorganisms on the panel surface covered with 5 wt % of albofungin-based coating reduced significantly. A total of 1,687,617 sequencing reads were analyzed from 6 biofilm samples and microbes in those biofilms were classified into 31 phyla. The 12-day biofilm, which was hereby referred to as 'old biofilms' (12-20 d biofilms) (Chung et al., 2010), was dominated mainly by Proteobacteria (Gammaproteobacteria, Alphaproteobacteria, Deltaproteobacteria), Bacteroidetes, Verrucomicrobia, and Actinobacteria (FIG. 7A). Alpha diversity was used to indicate microbial community diversity in the albofungin-based coating group and control group. The results of the Shannon-Weiner diversity index and observed OTUs were significantly reduced in the albofungin-based coating group, indicating an altered microbial community structure (FIGS. 7A-7C). The richness and diversity of microbial communities were also lower than those of the control group.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

REFERENCES

1. Bixler, G. D., & Bhushan, B. (2012). Biofouling: lessons from nature. Philosophical Transactions of the Royal Society A: Mathematical, Physical and Engineering Sciences, 370(1967), 2381-2417.
2. Bressy, C., NGuyen, M. N., Tanguy, B., & Margaillan, A. (2010). Poly (trialkylsilyl methacrylate) s: A family of hydrolysable polymers with tuneable erosion profiles. Polymer degradation and stability, 95(7), 1260-1268.
3. Bunyapaiboonsri, T., Lapanun, S., Supothina, S., Rachtawee, P., Chunhametha, S., Suriyachadkun, C., . . . & Vichai, V. (2016). Polycyclic tetrahydroxanthones from *Streptomyces chrestomyceticus* BCC 24770. Tetrahedron, 72(5), 775-778.
4. Callow, M. E., & Callow, J. A. (2002). Marine biofouling: a sticky problem. Biologist, 49(1), 1-5.
5. Champ, M. A. (2000). A review of organotin regulatory strategies, pending actions, related costs and benefits. Science of the total Environment, 258(1-2), 21-71.
6. Chung, H. C., Lee, O. O., Huang, Y. L., Mok, S. Y., Kolter, R., & Qian, P. Y. (2010). Bacterial community succession and chemical profiles of subtidal biofilms in relation to larval settlement of the polychaete *Hydroides elegans*. The ISME journal, 4(6), 817-828.
7. Heidarian, S., Mohammadipanah, F., Maghsoudlou, A., Dashti, Y., & Challis, G. L. (2019). Anti-microfouling activity of Glycomyces sediminimaris UTMC 2460 on dominant fouling bacteria of Iran marine habitats. Frontiers in microbiology, 9, 3148.
8. Hellio, C., & Yebra, D. (Eds.). (2009). Advances in marine antifouling coatings and technologies. Elsevier.
9. Livak, K. J., & Schmittgen, T. D. (2001). Analysis of relative gene expression data using real-time quantitative PCR and the 2-ΔΔCT method. methods, 25(4), 402-408.
10. Ma, C., Zhang, W., Zhang, G., & Qian, P. Y. (2017). Environmentally friendly antifouling coatings based on biodegradable polymer and natural antifoulant. ACS Sustainable Chemistry & Engineering, 5(7), 6304-6309.
11. Qian, P. Y., Chen, L., & Xu, Y. (2013). Mini-review: Molecular mechanisms of antifouling compounds. Biofouling, 29(4), 381-400.
12. Ralston, E., & Swain, G. (2009). Bioinspiration—the solution for biofouling control?. Bioinspiration & biomimetics, 4(1), 015007.
13. Satpathy, S., Sen, S. K., Pattanaik, S., & Raut, S. (2016). Review on bacterial biofilm: An universal cause of contamination. Biocatalysis and agricultural biotechnology, 7, 56-66.
14. Schindelin, J., Arganda-Carreras, I., Frise, E., Kaynig, V., Longair, M., Pietzsch, T., . . . & Cardona, A. (2012). Fiji: an open-source platform for biological-image analysis. Nature methods, 9(7), 676-682.
15. Schloss, P. D., Westcott, S. L., Ryabin, T., Hall, J. R., Hartmann, M., Hollister, E. B., . . . & Weber, C. F. (2009). Introducing mothur: open-source, platform-independent, community-supported software for describing and comparing microbial communities. Applied and environmental microbiology, 75(23), 7537-7541.
16. She, W., Ye, W., Cheng, A., Liu, X., Tang, J., Lan, Y., . . . & Qian, P. Y. (2021). Discovery, Bioactivity Evaluation, Biosynthetic Gene Cluster Identification, and Heterologous Expression of Novel Albofungin Derivatives. Frontiers in microbiology, 12, 77.
17. She, W., Ye, W., Shi, Y., Zhou, L., Zhang, Z., Chen, F., & Qian, P. Y. (2020). A novel chresdihydrochalcone from *Streptomyces chrestomyceticus* exhibiting activity against Gram-positive bacteria. The Journal of Antibiotics, 73(7), 429-434.
18. Sisson, A. L., Ekinci, D., & Lendlein, A. (2013). The contemporary role of E-caprolactone chemistry to create advanced polymer architectures. Polymer, 54(17), 4333-4350.
19. Srinivasan, R., Santhakumari, S., Poonguzhali, P., Geetha, M., Dyavaiah, M., & Xiangmin, L. (2021). Bacterial biofilm inhibition: A focused review on recent therapeutic strategies for combating the biofilm mediated infections. Frontiers in Microbiology, 12, 1106.
20. Stewart, P. S., & Costerton, J. W. (2001). Antibiotic resistance of bacteria in biofilms. The lancet, 358(9276), 135-138.
21. Wu, W. S., Cheng, W. C., Cheng, T. J. R., & Wong, C. H. (2018). Affinity-based screen for inhibitors of bacterial transglycosylase. Journal of the American Chemical Society, 140(8), 2752-2755.
22. Wang, K. L., Wu, Z. H., Wang, Y., Wang, C. Y., & Xu, Y. (2017). Mini-review: antifouling natural products from marine microorganisms and their synthetic analogs. Marine drugs, 15(9), 266.
23. Wang, K. L., Xu, Y., Lu, L., Li, Y., Han, Z., Zhang, J., . . . & Qian, P. Y. (2015). Low-toxicity diindol-3-ylmethanes as potent antifouling compounds. Marine Biotechnology, 17(5), 624-632.
24. Wang, R., Ding, W., Long, L., Lan, Y., Tong, H., Saha, S., . . . & Qian, P. Y. (2020). Exploring the Influence of Signal Molecules on Marine Biofilms Development. Frontiers in microbiology, 11.
25. Xie, Q., Pan, J., Ma, C., & Zhang, G. (2019). Dynamic surface antifouling: mechanism and systems. Soft Matter, 15(6), 1087-1107.
26. Xu, Y., He, H., Schulz, S., Liu, X., Fusetani, N., Xiong, H., . . . & Qian, P. Y. (2010). Potent antifouling compounds produced by marine *Streptomyces*. Bioresource Technology, 101(4), 1331-1336.
27. Yoon, S. H., Ha, S. M., Kwon, S., Lim, J., Kim, Y., Seo, H., & Chun, J. (2017). Introducing EzBioCloud: a taxonomically united database of 16S rRNA gene sequences and whole-genome assemblies. International journal of systematic and evolutionary microbiology, 67(5), 1613.
28. Zhou, X., Xie, Q., Ma, C., Chen, Z., & Zhang, G. (2015). Inhibition of marine biofouling by use of degradable and hydrolyzable silyl acrylate copolymer. Industrial & Engineering Chemistry Research, 54(39), 9559-9565

We claim:

1. An antifouling composition comprising at least one coating component and a compound according to formula (I) formula (II), formula (III), formula (IV), or any combination thereof:

Formula (I)

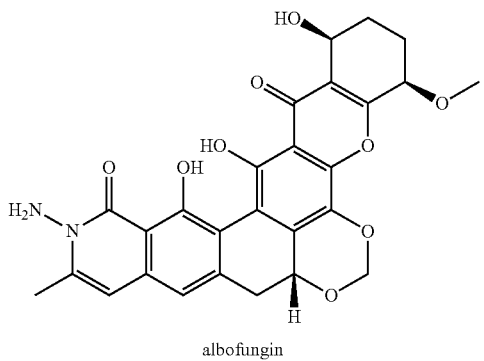

albofungin

Formula (II)

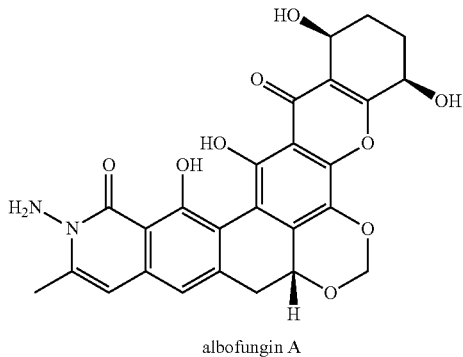

albofungin A

Formula (III)

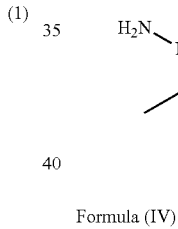

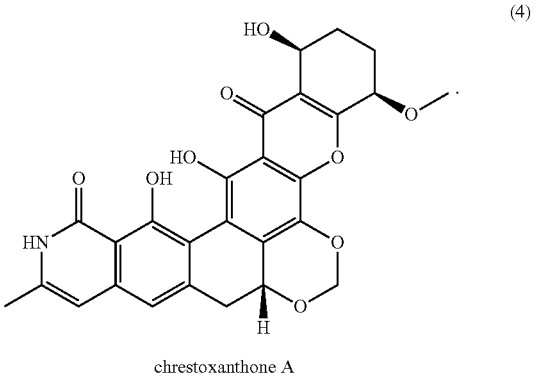

chloroalbofungin

Formula (IV)

chrestoxanthone A

2. The composition of claim 1, wherein the coating component is a polymer, binder, pigment, solvent, buffering agent, or any combination thereof.

3. The composition of claim 2, wherein the compound according to formula (I) formula (II), formula (III), formula (IV), or any combination thereof is at a concentration of about 1% to about 10%; and the polymer, binder, pigment, solvent, buffering agent, or any combination thereof is at a concentration of about 80% to about 99%.

4. The composition of claim 2, wherein the polymer comprises methyl methacrylate (MMA) and tributylsilyl methacrylate (TBSM).

5. The composition of claim 4, wherein the polymer is an MMA and TBSM copolymer (PMSMO).

6. A method for inhibiting growth or settlement of an organism, said method comprising contacting a composition comprising compound according to formula (I) formula (II), formula (III), formula (IV), or any combination thereof to the organism or applying an effective amount of the composition to a surface and/or an object:

Formula (I)

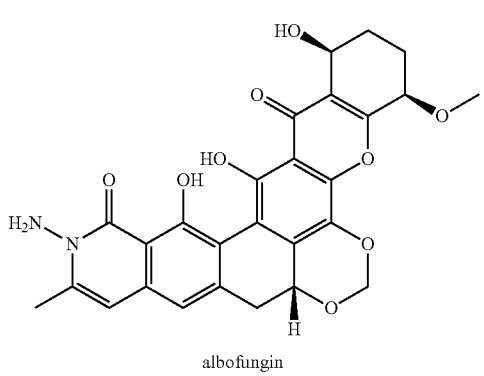

albofungin

Formula (II)

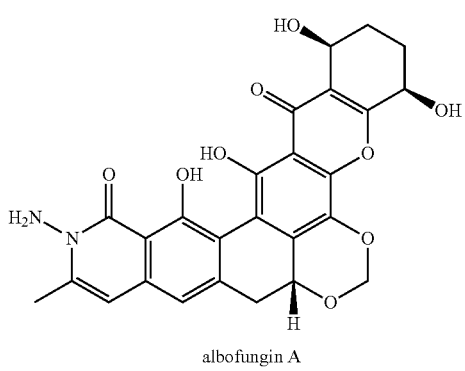

albofungin A

Formula (III)

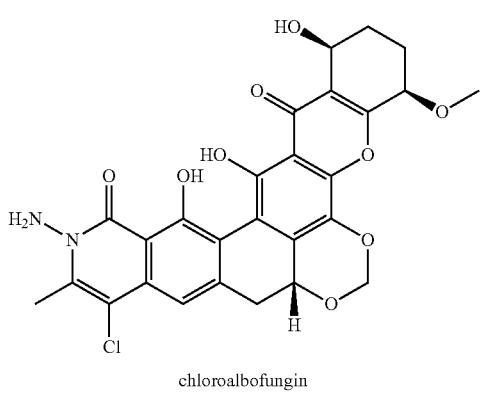

chloroalbofungin

Formula (IV)

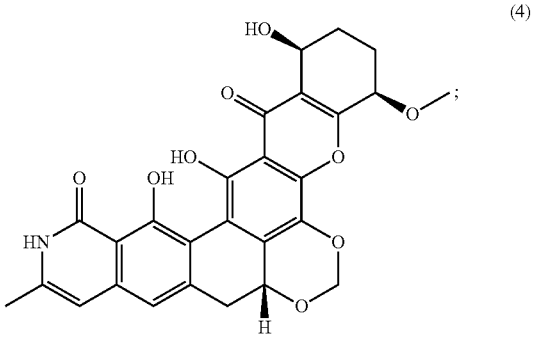

chrestoxanthone A whereby the growth of the organism is inhibited on the surface or object.

7. The method of claim 6, wherein the composition further comprises a coating component.

8. The method of claim 7, wherein the coating component is a polymer, binder, pigment, solvent, buffering agent, or any combination thereof.

9. The method of claim 8, wherein the polymer comprises methyl methacrylate (MMA) and tributylsilyl methacrylate (TBSM).

10. The method of claim 6, wherein the surface and/or object is submerged in water or is a medical device.

11. The method of claim 10, wherein the submerged surface and/or object is a ship, hull, tubing, pipe, pump, propeller, buoy, or rope.

12. The method of claim 6, further comprising releasing the compound according to formula (I) formula (II), formula (III), formula (IV), or any combination thereof from the composition after application to the object and/or surface at a rate of about 0.1 µg day$^{-1}$ cm$^{-2}$ to about 5 µg day$^{-1}$ cm$^{-2}$.

13. The method of claim 6, further comprising inhibiting biofilm formation.

14. A method for improving the performance and/or longevity of a surface and/or object, the method comprising applying a composition comprising compound according to formula (I) formula (II), formula (III), formula (IV), or any combination thereof to the surface and/or object:

Formula (I)

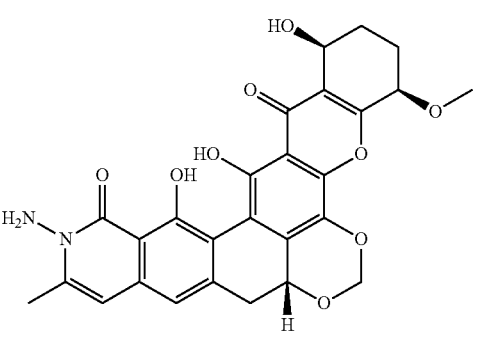

albofungin

Formula (II)

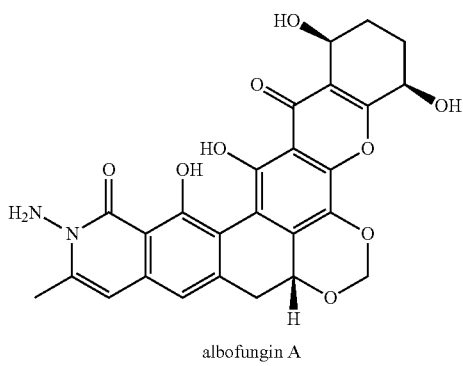

albofungin A

Formula (III)

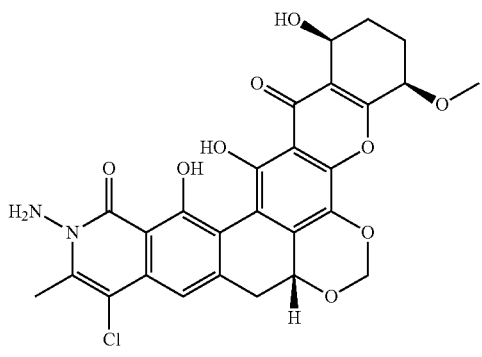

chloroalbofungin

Formula (IV)

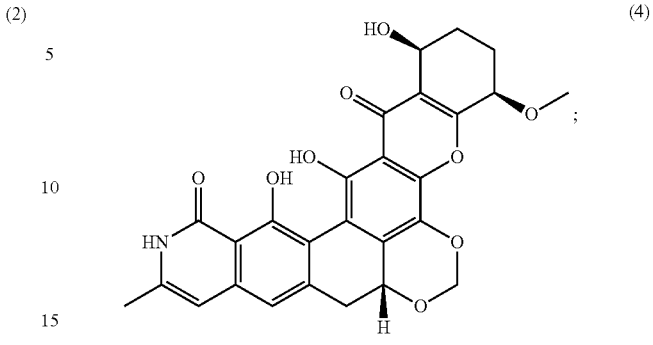

chrestoxanthone A whereby the performance and/or longevity of the surface and/or object is improved.

15. The method of claim 14, wherein the performance and/or longevity of the surface and/or object is improved by inhibiting fouling by biological contaminants.

16. The method of claim 15, further comprising inhibiting biofilm formation by the biological contaminants.

17. The method of claim 14, wherein the composition further comprises a coating component.

18. The method of claim 17, wherein the coating component is a polymer, binder, pigment, solvent, buffering agent, or any combination thereof.

19. The method of claim 18, wherein the polymer comprises methyl methacrylate (MMA) and tributylsilyl methacrylate (TBSM).

20. The method of claim 14, wherein the surface and/or object is submerged in water or is a medical device.

21. The method of claim 20, wherein the submerged surface and/or object is a ship, hull, tubing, pipe, pump, propeller, buoy, or rope.

* * * * *